(12) United States Patent
Miller

(10) Patent No.: US 6,882,924 B2
(45) Date of Patent: Apr. 19, 2005

(54) VALVE FLOW CONTROL SYSTEM AND METHOD

(75) Inventor: Nathan Todd Miller, San Diego, CA (US)

(73) Assignee: Precision Engine Controls Corp., San Diego, CA (US)

(*) Notice: Subject to any disclaimer, the term of this patent is extended or adjusted under 35 U.S.C. 154(b) by 10 days.

(21) Appl. No.: 10/680,617

(22) Filed: Oct. 6, 2003

(65) Prior Publication Data

US 2005/0021213 A1 Jan. 27, 2005

Related U.S. Application Data

(60) Provisional application No. 60/467,911, filed on May 5, 2003.

(51) Int. Cl.[7] .................................................. G01H 3/00
(52) U.S. Cl. ........................................ 701/100; 477/30
(58) Field of Search ............................ 701/29, 99, 100, 701/101, 104; 340/439; 702/183; 251/118–127; 137/511–516.2; 700/28–34; 477/30; 60/235, 239

(56) References Cited

U.S. PATENT DOCUMENTS

| | | |
|---|---|---|
| 3,809,362 A | 5/1974 | Baumann |
| 3,977,382 A | 8/1976 | Tuzson et al. ............... 123/139 |
| 4,190,231 A | 2/1980 | Vimercati .................... 251/118 |
| 4,360,370 A | 11/1982 | McAndrew ................... 55/302 |
| 4,362,185 A | 12/1982 | Kadner .................. 137/516.29 |
| 4,474,356 A | 10/1984 | Baumann .................... 251/122 |
| 4,506,860 A | 3/1985 | Von Schwerdtner et al. .......................... 251/124 |

(Continued)

OTHER PUBLICATIONS

U.S. Appl. No. 10/429,092, filed May 3, 2003, Mares et al.

*Primary Examiner*—Richard M. Camby
(74) *Attorney, Agent, or Firm*—Wells St. John P.S.

(57) ABSTRACT

A turbine valve control system is provided. The turbine valve control system includes a variable flow metering device, a first sensor, a second sensor, a third sensor, a fourth sensor, memory, and processing circuitry. The variable flow metering device is capable of meeting a plurality of predetermined mass flow rates by varying positioning of the flow metering device. The first sensor is configured for detecting variable positioning of the flow metering device and generating a first output signal that is a function of the positioning of the flow metering device. The second sensor is configured for detecting fluid pressure upstream of the flow metering device and generating a second output signal that is a function of the detected upstream fluid pressure. The third sensor is configured for detecting fluid pressure downstream of the flow metering device and generating a third output signal that is a function of the detected downstream fluid pressure. The fourth sensor is configured for detecting temperature upstream of the flow metering device and generating a fourth output signal that is a function of the detected temperature. The memory includes first computer program code for calculating a combined coefficient of discharge times area that gives a desired flow for a given valve position, upstream pressure, downstream pressure, and temperature for subsonic flow. The memory also includes second computer program code for calculating a combined coefficient of discharge times area that gives a desired flow for a given valve position, upstream pressure, and temperature for sonic flow. The processing circuitry is configured to receive the signals, determine whether the flow is subsonic or sonic, and implement a corresponding one of the first and second computer program codes to calculate a combined coefficient of discharge times area that will generate a desired mass flow rate for the flow metering device. A method is also provided.

32 Claims, 12 Drawing Sheets

U.S. PATENT DOCUMENTS

| | | | |
|---|---|---|---|
| 4,522,223 A | 6/1985 | Balsys et al. | 137/240 |
| 4,607,822 A | 8/1986 | Schabert et al. | 251/334 |
| 4,646,786 A | 3/1987 | Herder et al. | 137/625.69 |
| 4,679,765 A | 7/1987 | Kramer et al. | 251/38 |
| 4,728,075 A | 3/1988 | Paradis | 251/122 |
| 4,796,651 A | 1/1989 | Ginn et al. | 137/8 |
| 4,842,246 A | 6/1989 | Floren et al. | 251/333 |
| 4,850,392 A | 7/1989 | Crump et al. | 137/513 |
| 4,976,404 A | 12/1990 | Ichikawa et al. | 251/121 |
| 5,107,674 A * | 4/1992 | Wibbelsman et al. | 60/778 |
| 5,123,436 A | 6/1992 | Koechlein et al. | 137/12 |
| 5,146,941 A | 9/1992 | Statler | 137/8 |
| 5,211,198 A | 5/1993 | Tinholt | 137/625.27 |
| 5,232,195 A | 8/1993 | Torrielli | 251/129.08 |
| 5,259,590 A | 11/1993 | Chambers | 251/334 |
| 5,309,934 A | 5/1994 | Jaeger | 137/1 |
| 5,318,270 A | 6/1994 | Detanne et al. | 251/120 |
| 5,379,584 A * | 1/1995 | Windish et al. | 60/204 |
| 5,503,363 A | 4/1996 | Wallace | 251/62 |
| 5,544,856 A | 8/1996 | King et al. | 251/129.08 |
| 5,594,665 A * | 1/1997 | Walter et al. | 700/301 |
| 5,618,022 A | 4/1997 | Wallace | 251/62 |
| 5,641,148 A | 6/1997 | Pena et al. | 251/129.07 |
| 5,878,992 A | 3/1999 | Edwards et al. | 251/122 |
| 5,904,335 A | 5/1999 | Oyama | 251/129.07 |
| 5,915,669 A | 6/1999 | Zabeck et al. | 251/129.16 |
| 6,129,333 A | 10/2000 | Ma | 251/68 |
| 6,392,322 B1 | 5/2002 | Mares et al. | 310/88 |
| 6,427,970 B1 | 8/2002 | Silva | 251/129.01 |

* cited by examiner

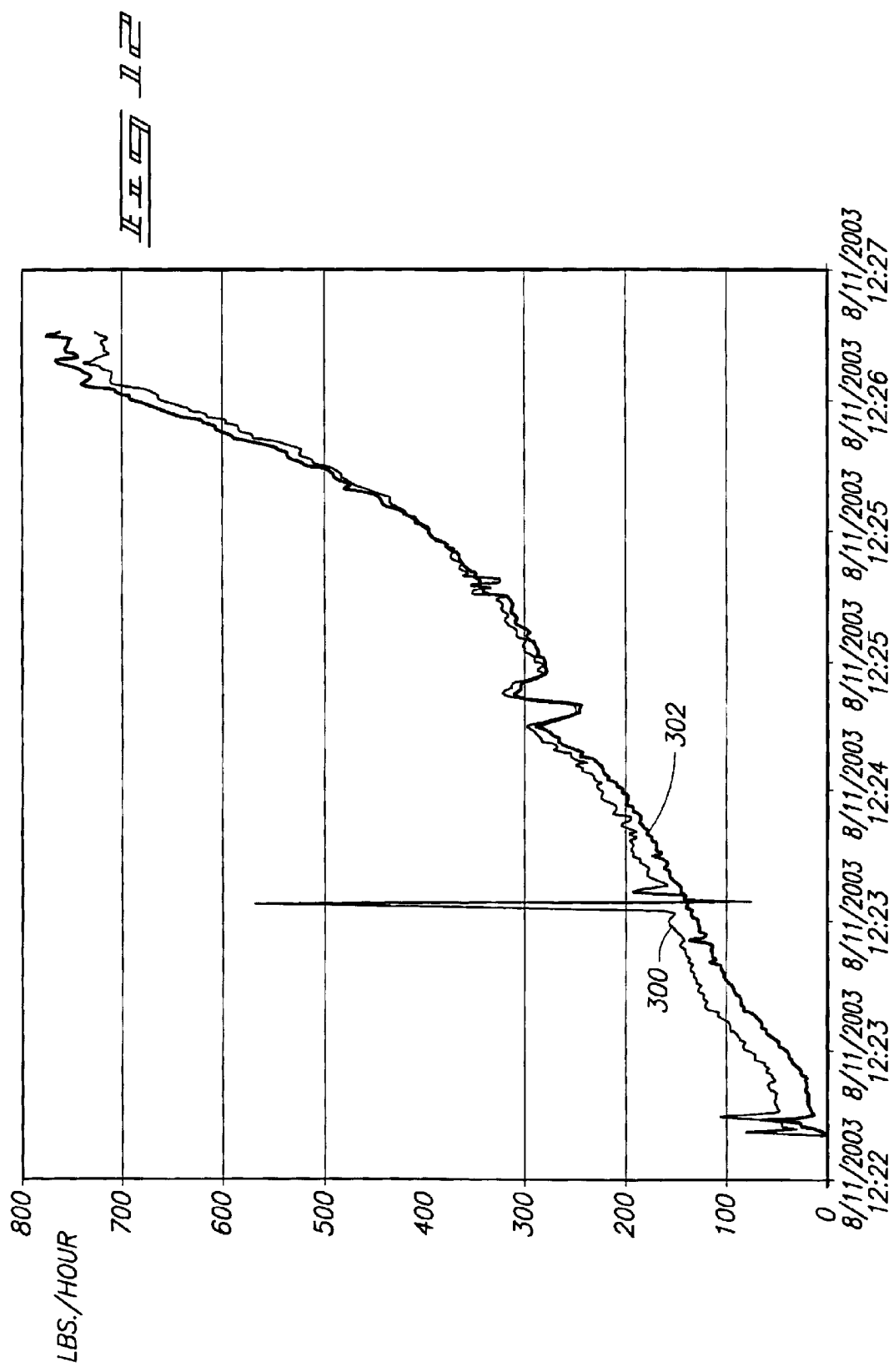

VALVE FLOW CONTROL SYSTEM AND METHOD

CROSS-REFERENCE TO RELATED APPLICATION

This application claims priority in U.S. Provisional Patent Application Ser. No. 60/467,911, entitled "Turbine Valve Control System and Method", naming as inventor Nathan Todd Miller, which was filed on May 5, 2003, and which is incorporated by reference herein.

TECHNICAL FIELD

The present invention pertains to fuel delivery valves. More particularly, the present invention relates to fuel metering valves and control systems that regulate delivery of fuel to a turbine engine.

BACKGROUND OF THE INVENTION

Liquid and gas fuel metering valves have been used for a number of industrial turbine engine applications. For example, liquid fuel metering valves have been used in numerous marine applications.

In another case, gas fuel metering valves have been coupled with industrial turbine engines. For example, VG Series gas fuel metering valves such as the VG1.5, sold by Precision Engine Controls Corporation of San Diego, Calif., assignee of the present invention, have a balanced design with a single moving part. However, the gas flow path that extends through such valves deviates substantially from a linear flow path, requiring fuel to transit laterally around 90° lateral corners which reduces efficiency and performance.

Applications for such fuel metering valves are present in the power industry for generating electrical power with gas turbine engines, for implementation on offshore oil rigs for power generation, on turbine engines in marine applications such as on hovercraft, and in the pipeline industry for related gas turbine engine applications requiring precise fuel metering.

Many fuel metering techniques require the use of a Coriolis flow meter in combination with a metering valve. However, these flow meters are very expensive and cost-prohibitive, which restricts their adoption for many applications and uses.

Accordingly, improvements are needed to increase controllable flow accuracy and efficiency from a fuel metering valve to a gas turbine engine, and to reduce cost of implementation. Additionally, improvements are needed in order to easily reconfigure a fuel metering valve to optimize the accuracy and efficiency of fuel delivery over varying ranges of supply pressure. Even furthermore, improvements are needed in the manner in which a fuel metering valve is controlled in order to deliver a desired flow rate of fuel without requiring the utilization of a separate flow meter which can significantly increase cost and complexity.

SUMMARY OF THE INVENTION

A gas turbine valve control system is provided for a gas turbine valve with a displacement sensor for detecting position of the valve, an upstream pressure sensor, an upstream temperature sensor, and a downstream pressure sensor. Sonic and subsonic flow equations are selectively used to determine valve position that achieves a desired fuel mass flow rate for the valve.

According to one aspect, a turbine valve control system is provided. The turbine valve control system includes a variable flow metering device, a first sensor, a second sensor, a third sensor, a fourth sensor, memory, and processing circuitry. The variable flow metering device is capable of meeting a plurality of predetermined mass flow rates by varying positioning of the flow metering device. The first sensor is configured for detecting variable positioning of the flow metering device and generating a first output signal that is a function of the positioning of the flow metering device. The second sensor is configured for detecting fluid pressure upstream of the flow metering device and generating a second output signal that is a function of the detected upstream fluid pressure. The third sensor is configured for detecting fluid pressure downstream of the flow metering device and generating a third output signal that is a function of the detected downstream fluid pressure. The fourth sensor is configured for detecting temperature upstream of the flow metering device and generating a fourth output signal that is a function of the detected temperature. The memory includes first computer program code for calculating a combined coefficient of discharge times area that gives a desired flow for a given valve position, upstream pressure, downstream pressure, and temperature for subsonic flow. The memory also includes second computer program code for calculating a combined coefficient of discharge times area that gives a desired flow for a given valve position, upstream pressure, and temperature for sonic flow. The processing circuitry is configured to receive the signals, determine whether the flow is subsonic or sonic, and implement a corresponding one of the first and second computer program codes to calculate a combined coefficient of discharge times area that will generate a desired mass flow rate for the flow metering device.

According to another aspect, a method is provided for measuring gas flow rate into a gas turbine engine. The method includes: providing an adjustable position valve having a known coefficient of discharge and flow area for meeting a predetermined mass flow rate at each position of the valve; sensing position of the valve; sensing pressure upstream of the valve; sensing pressure downstream of the valve; sensing temperature upstream of the valve; determining whether flow through the valve is subsonic or sonic; based on whether the flow is determined to be subsonic or sonic, calculating a coefficient of discharge times area for the valve that provides a desired flow rate through the valve; and positioning the valve to a new position that achieves the calculated coefficient of discharge times area for the valve.

According to yet another aspect, a turbine valve control system is provided. The turbine valve control system includes means for realizing any of a plurality of predetermined mass flow rates; means for detecting position of the flow metering device and generating a first output signal that is a function of the positioning of the flow metering device; means for detecting fluid pressure upstream of the flow metering device and generating a second output signal that is a function of the detected upstream fluid pressure; means for detecting fluid pressure downstream of the flow metering device and generating a third output signal that is a function of the detected downstream fluid pressure; means for detecting temperature upstream of the flow metering device and generating a fourth output signal that is a function of the detected temperature; means for determining a combined coefficient of discharge times area that gives a desired flow for a given valve position, upstream pressure, downstream pressure, and temperature for subsonic flow and second calculating means for calculating a combined coefficient of discharge times area that gives a desired flow for a given valve position, upstream pressure, and temperature for sonic flow; and means for determining whether flow is subsonic or sonic, and configured to implement a corresponding one of the first and second computer program codes to calculate a combined coefficient of discharge times area that will generate a desired mass flow rate for the flow metering device.

BRIEF DESCRIPTION OF THE DRAWINGS

Preferred embodiments of the invention are described below with reference to the following accompanying drawings.

FIG. 12 is a graph illustrating one experimental test result for realizing flow demand using the valve and valve control system of FIGS. 1–11.

DETAILED DESCRIPTION OF THE PREFERRED EMBODIMENTS

Figure 1:
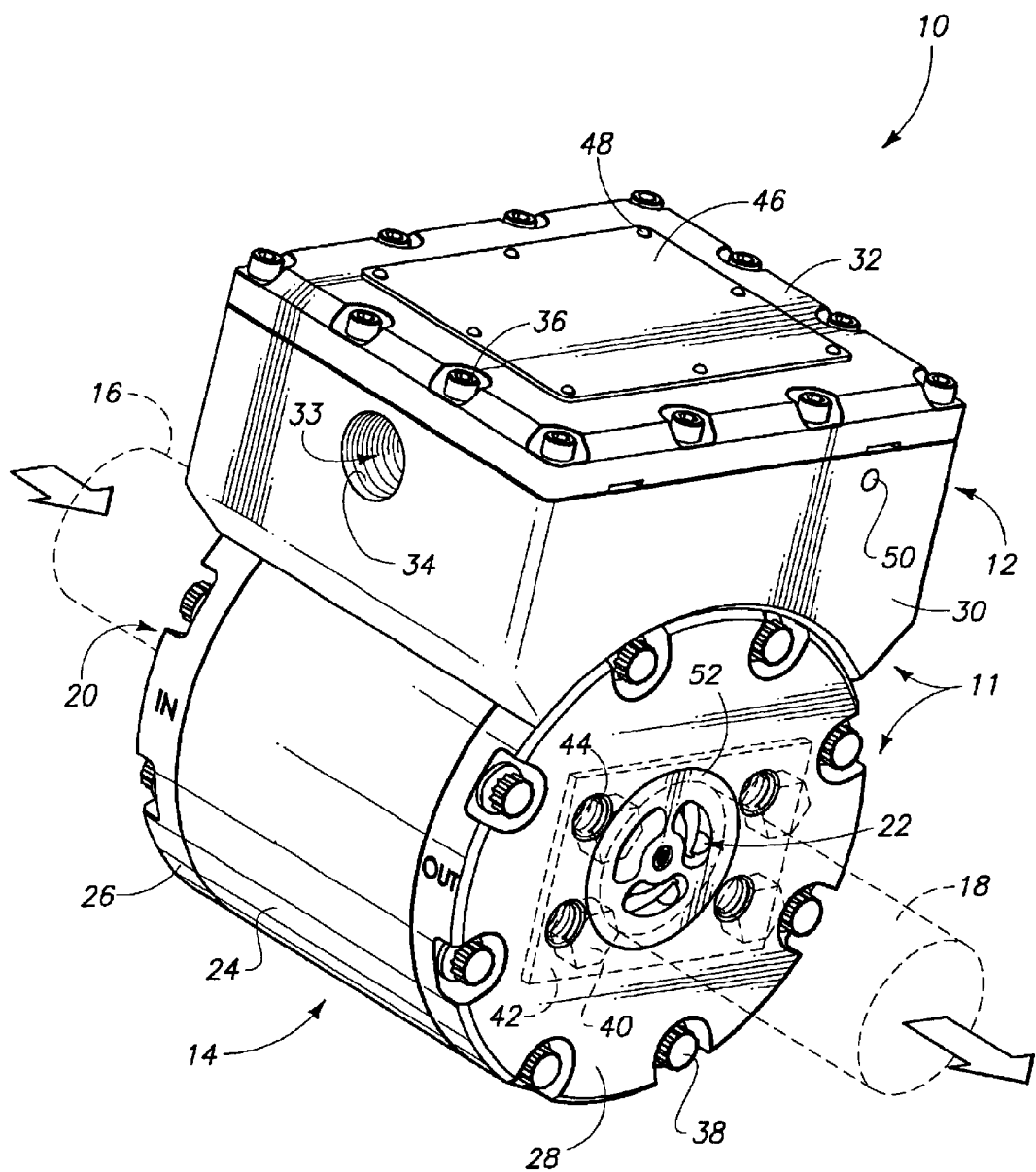
FIG. 1 is an isometric view of a metering valve provided in an application environment for delivering fuel at a controlled rate to a gas turbine engine, according to one aspect of the invention.

This disclosure of the invention is submitted in furtherance of the constitutional purposes of the U.S. Patent Laws "to promote the progress of science and useful arts" (Article 1, Section 8).

Reference will now be made to a preferred embodiment of Applicants' invention. An exemplary implementation is described below and depicted with reference to the drawings comprising a fuel metering valve and control system for delivering fuel to industrial gas turbine engines. A first embodiment is shown and described below in a configuration with reference generally to FIGS. 1–11. While the invention is described by way of a preferred embodiment, it is understood that the description is not intended to limit the invention to this embodiment, but is intended to cover alternatives, equivalents, and modifications which may be broader than this embodiment such as are defined within the scope of the appended claims.

In an effort to prevent obscuring the invention at hand, only details germane to implementing the invention will be described in great detail, with presently understood peripheral details being incorporated by reference, as needed, as being presently understood in the art.

A metering valve implementing a valve control system and method of the present invention is described with reference to FIGS. 1–11 and is identified by reference numeral 10. Such a metering valve 10 is particularly suited for use with industrial gas turbine engines. Construction and operation of physical components for this exemplary valve are described below with reference to FIGS. 1–4. Further details of the exemplary valve are disclosed in U.S. patent application Ser. No. 10/429,092 entitled "Gas Turbine Metering Valve", naming the inventors as E. Joseph Mares, Nathan Todd Miller, and Mark Robert Huebscher, filed on May 3, 2003, and herein incorporated by reference. A description of the control system for the metering valve and operation are provided with reference to FIGS. 5–11.

A. Valve Construction

As described below and also as previously incorporated by reference, metering valve 10 comprises a single exemplary metering valve capable of benefiting from control system features of the present invention. However, it is understood that a valve control system and method are provided by the present invention capable of being incorporated in any of a number of flow control devices, including any of a number of presently known control valve constructions that form alternative configurations to metering valve 10 of FIGS. 1–4. Metering valve 10 of FIGS. 1–4 provides but one exemplary implementation, and it is envisioned that other implementations can benefit from the present control system and method as described below in greater detail.

As shown in FIG. 1, metering valve 10 is configured to provide flow control, contamination resistance, and precision control over a wide flow range and within a relatively compact package size. The metering valve is also configured with a control system for use with high-performance, low-emissions, industrial gas turbines that require more than just reliable fuel control in order to optimize gas turbine engine functionality. Such applications demand stable, fast, and accurate fuel flow control for a variety of supply pressures and gases.

Figure 3:
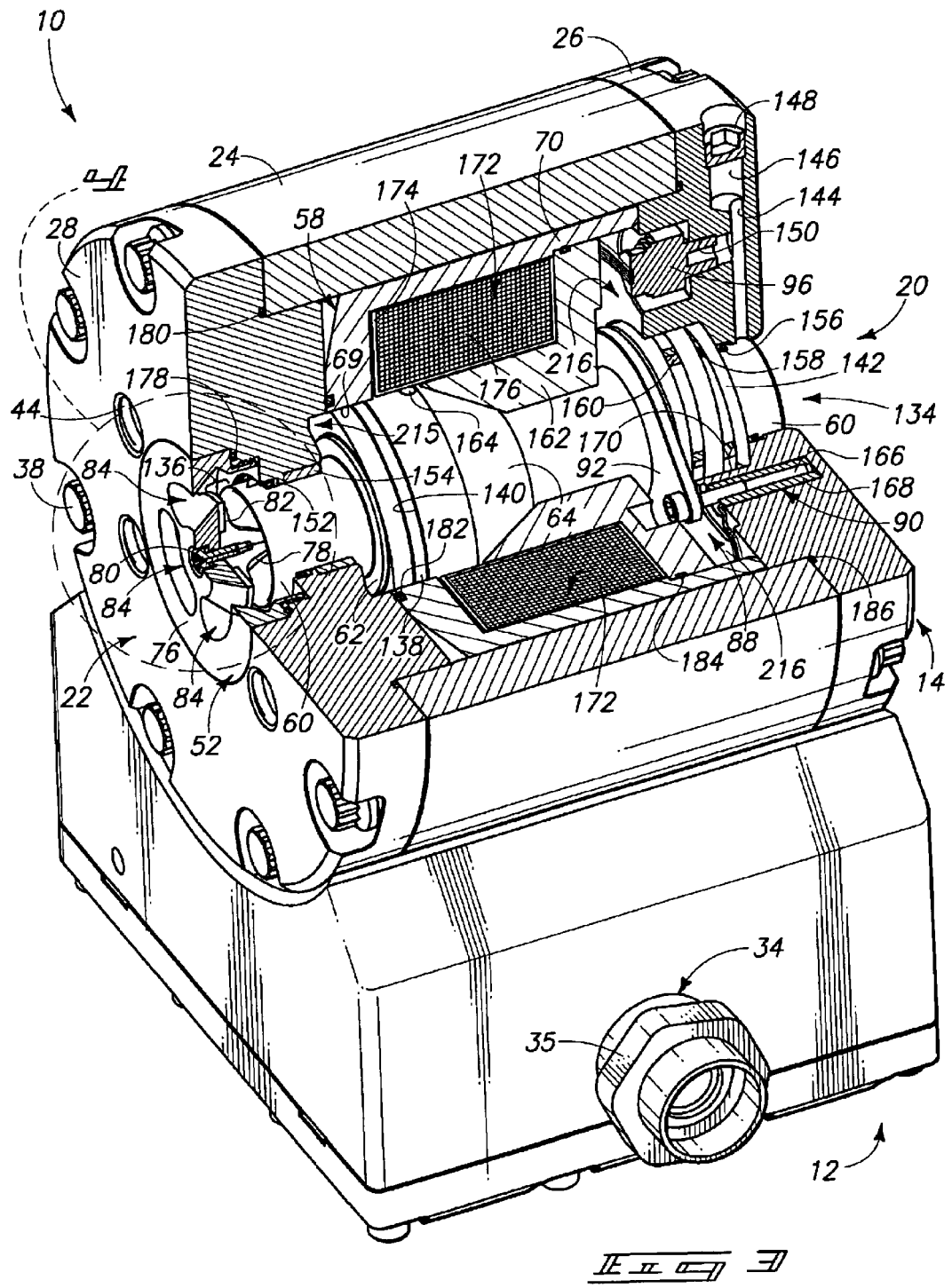
FIG. 3 is a partial breakaway isometric view of the metering valve of FIGS. 1–2, with the metering valve positioned upside down and viewed relative to an outlet end.
Figure 4:
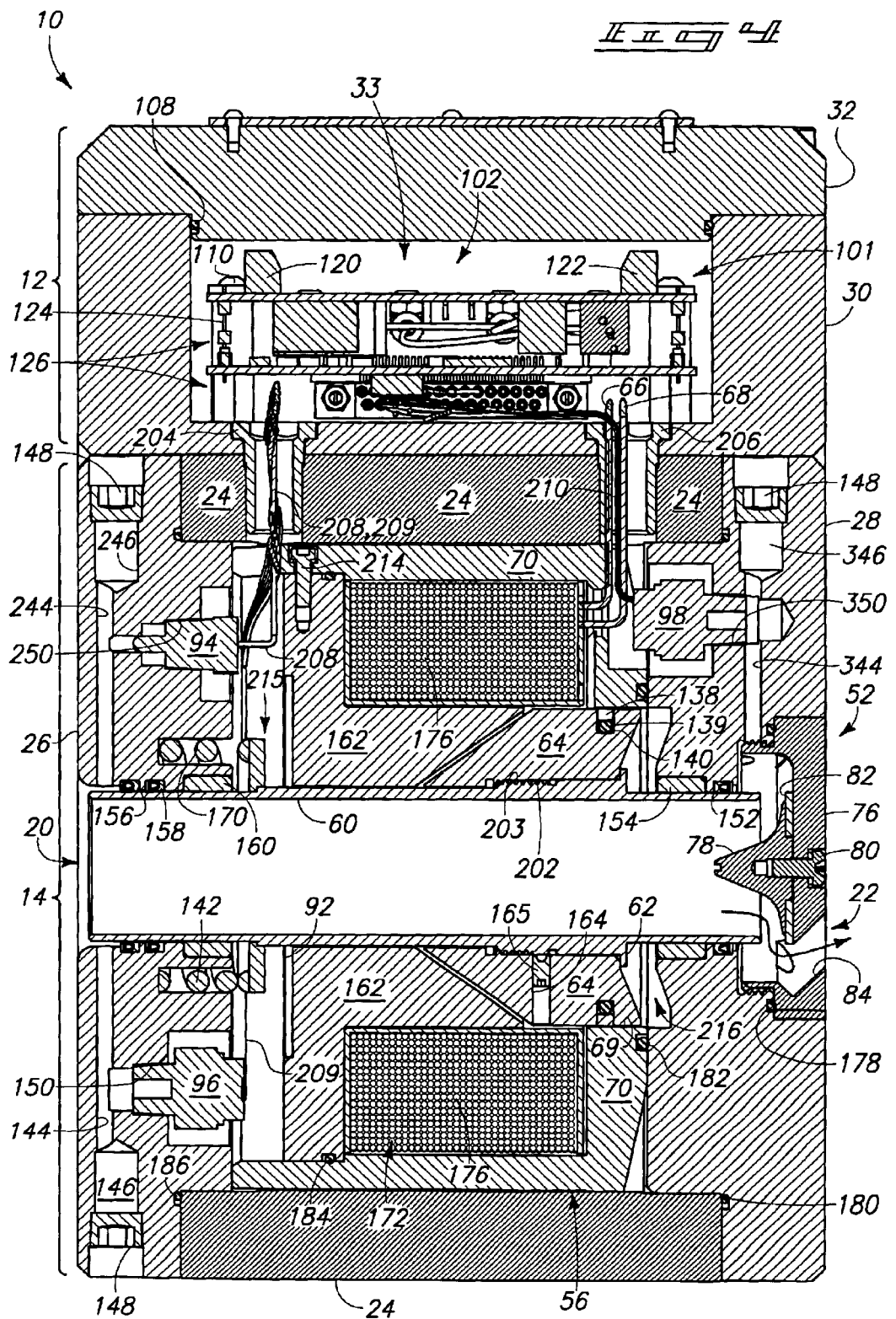
FIG. 4 is a vertical centerline sectional view taken through the center of the machine illustrating the internal construction of the metering valve.

In order to achieve this result, metering valve 10 is configured with a valve housing 11 that is formed by an electronics enclosure assembly 12 and a valve body assembly 14 that are secured together by fasteners (see hollow bolts 204 and 206 in FIG. 4). According to one construction, housing 11 is formed from 6061-T6 aluminum alloy. Additionally, housing assembly 11 includes various O-ring seals 178, 180, 182, 184 and 186, as shown in FIGS. 3 and 4. Metering valve 10 is mated in sealed engagement with an inlet supply pipe 16 and an outlet supply pipe 18 to deliver fuel from inlet supply pipe 16 in a metered and precisely controlled manner out through outlet supply 18 to a turbine engine (not shown) where it is combusted. Inlet supply pipe 16 is secured with fasteners (not shown) through a mounting end plate at a flow inlet 20, whereas outlet supply pipe 18 is affixed to metering valve 10 via an end plate 42 using similar threaded fasteners, such as individual hex head bolts 40. Outlet supply pipe 18 is secured in sealing engagement with a flow outlet 22 of metering valve 10.

It is understood that inlet supply pipe 16 has an end plate that is similar to end plate 42 of outlet supply pipe 18, and is secured with fasteners similar to threaded bolts 40 which are received within threaded bores 44 of an outlet end plate 28. In the case of flow inlet 20, inlet supply pipe 16 secures with threaded fasteners using a similar end plate within threaded bores. It is further understood that each end plate includes a circumferential groove that extends about the respective flow inlet or outlet into which an O-ring is received for sealing and mating engagement between the respective end plate and an orifice plate assembly 52 (in the case of outlet supply pipe 18) and a corresponding circumferential portion of inlet end plate 26 (in the case of inlet supply pipe 16).

Valve body assembly 14 includes a cylindrical valve housing 24 to which inlet end plate 26 and outlet end plate 28 are each affixed at opposite ends using a plurality of threaded, high-strength steel, double hex bolts (or fasteners) 38. Fasteners 38 are preferably equally spaced apart about the circumference of each end plate 26 and 28. A corresponding end portion at each end of valve housing 24 includes complementary, corresponding threaded bores 86 configured to receive fasteners 38. Each end plate 26 and 28 includes a plurality of bores (not shown) that extend completely through the end plate, and are sized to receive each fastener 38 therethrough for threaded engagement within valve housing 24, such as into a respective, threaded aperture 86.

Electronics enclosure assembly 12 includes an electronics housing 30 which is fastened to valve housing 24 using hollow bolts 204 and 206 (as shown in FIG. 4) and a plurality of threaded cap screws (or fasteners) not shown. A cover 32 is affixed atop electronics housing 30 for encasing electronics 33 therein, including electronics that accurately control flow rate through metering valve 10. More particularly, a plurality of threaded cap screws (or fasteners) 36 are used to secure cover 32 atop electronics housing 30. Similarly, each cap screw 36 is passed through a through-bore within cover 32 and into a threaded bore 104 within a topmost edge of electronics housing 30 where such fasteners are threadingly received to retain cover 32 atop electronics housing 30.

Electronics housing 30 also includes a conduit hole 34 through which a turbine engine explosion-proof conduit is passed therethrough. Conduit hole 34 comprises a ¾" NPT thread. As shown in FIG. 3, an explosion-proof conduit fitting (or union) 35 is threaded into hole 34. More particularly, an explosion-proof wire harness or conduit is passed through conduit hole 34 and fitting 35, after which fitting 35 is potted with a sealing cement and filler so as to make conduit hole 34 explosion proof and sealed as the conduit passes therethrough. One form of sealing cement for use in fitting 35 comprises Kwik Cement, sold by Appleton Electric Company, 1701 West Wellington Avenue, Chicago, Ill. 60657. One form of explosion-proof conduit fitting comprises a UNY or UNF union, also sold by Appleton Electric Company, 1701 West Wellington Avenue, Chicago, Ill. 60657.

Electronics housing 30 of metering valve 10 is constructed as an explosion-proof housing having flame paths. U.S. Pat. No. 6,392,322 to Mares, et al., issued May 21, 2002 and assigned to the present assignee, teaches one suitable technique for providing flame paths in an explosion-proof housing. Such construction techniques are also used herein in order to achieve an explosion-proof electronics housing 30 that is suitable for use in a potentially explosive user environment.

Also shown in FIG. 1, a metal name plate 46 is secured atop cover 32 using a plurality of threaded drive screws 48. Product information for metering valve 10 is then printed on or etched into name plate 46. Furthermore, a threaded ground hole 50 is also provided within a side wall of electronics housing 30 into which a threaded fastener and a ground strap can be attached thereto for grounding the housing of metering valve 10. Preferably, ground hole 50 does not pass completely through the side wall of electronics housing 30.

Figure 2:
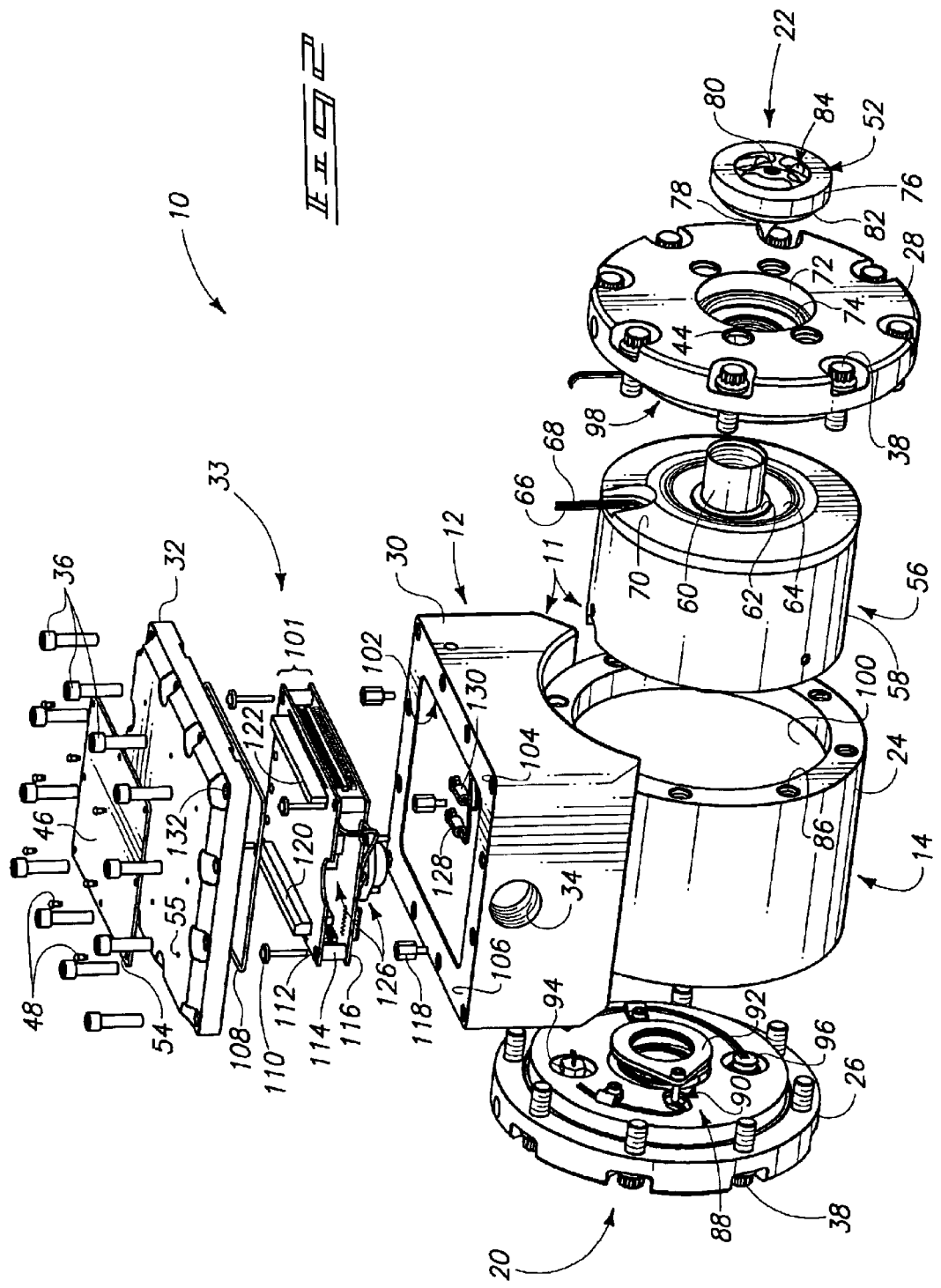
FIG. 2 is an exploded isometric view of the metering valve illustrated in FIG. 1 depicting assembly and placement of internal components.

According to FIG. 2, metering valve 10 is shown in an exploded view to further facilitate understanding of the construction and operation of components contained therein. More particularly, metering valve 10 provides a stable, fast and accurate fuel flow control system extending over a range of supply pressures and gases. Because of the particular design of metering valve 10, a flow-through design is provided that is capable of automatically compensating for variations in pressure and temperature in order to provide precise fuel flow required for specific gas turbine conditions under which the turbine and valve must operate. The electronics assembly includes a determination of fuel flow measurement based on valve feedback derived from pressure, temperature and displacement sensors in the valve, as discussed below. The valve is programmable for flow versus demand and complete closed-loop fuel control is made possible when using particular interface features. Accordingly, metering valve 10 is capable of being programmable for flow versus demand.

Metering valve 10 provides a smooth flow-through design by way of an orifice plate assembly 52 that is carried in outlet end plate 28 by way of a female threaded bore 74 (see FIG. 2) including a female threaded portion. An axial mover 56 comprising a linear motor 58 supports and moves a central cylindrical flow tube 60 toward and away from orifice plate assembly 52 in order to regulate flow through the orifice plate assembly 52. By moving flow tube 60 into engagement with a seal 82 on orifice plate assembly 52 (see FIG. 3), flow is completely stopped at orifice plate assembly 52, and flow outlet 22 is completely closed. By actuating linear motor 58 to move flow tube 60 towards an upstream position away from orifice plate assembly 52, an annular gap 136 (see FIG. 3) is formed between the downstream end of flow tube 60 and seal 82 of orifice plate assembly 52.

In operation, the flow rate of fuel can be controlled by precisely positioning flow tube 60 relative to orifice plate assembly 52. The relative position of the downstream end of flow tube 60 and orifice plate assembly 52 can be varied by accurately positioning flow tube 60 relative thereto. Additionally, flow is tailored based upon the specific axial and radial geometry provided on a flow diverter 78 of orifice plate assembly 52. Flow diverter 78 extends upstream and within flow tube 60 so as to vary the dimension of the annular gap 136 (see FIG. 3) formed therebetween for various positions of the downstream end of flow tube 60 relative to orifice plate assembly 52.

As shown in FIG. 2, orifice plate assembly 52 comprises a cylindrical orifice plate 76 that includes three crescent-shaped flow apertures 84 that are spaced radially about orifice plate 76. According to such construction, orifice plate 76 comprises a spider in which three flow apertures 84 are provided between the spokes of such spider. Orifice plate 76 includes a plurality of male threads adjacent an upstream edge that mate in threading engagement within a threaded bore 74 of outlet end plate 28. A radial outermost portion of orifice plate 76 is received within a complementary bore 72 of outlet end plate 28. According to one construction, orifice plate 76 is made from Nitronic™ 50, a version of 316 stainless steel (SS).

One desirable feature of the present metering valve is provided by the ability to replace flow diverter 78 with an alternative flow diverter having a different axial profile by removing threaded fastener 80 which retains flow diverter 78 onto orifice plate 76. Subsequently, a new, alternatively constructed flow diverter can be mounted upstream and onto orifice plate 76 by re-inserting threaded fastener 80 and threading such flow diverter into engagement therewith. Hence, sensitivity of metering valve 10 can be optimized for different ranges of flow rates by substituting in an optional flow diverter having a desired shape.

Linear motor 58 of FIG. 2 includes a motor housing 70 from which a pair of solenoid wires 66 and 68 extends for connection with corresponding electronics 33 within electronics enclosure assembly 12. A circumferential shoulder 62 is rigidly secured to a location on flow tube 60. Shoulder 62 helps retain an armature 64 at a precise location along flow tube 60. Linear motor 58, in assembly, is received within an internal bore 100 of valve housing 24.

In assembly, the double hex bolts 38 extend through outlet end plate 28 and into complementary, corresponding threaded apertures 86 at a downstream end of valve housing 24. Similarly, double hex bolts 38 extend through corresponding apertures in inlet end plate 26 and into threaded apertures in an upstream end of valve housing 24 (similar to threaded apertures 86 provided at a downstream end of valve housing 24, but not shown).

Inlet end plate 26, as shown in FIG. 2, is likewise affixed to an upstream end of valve housing 24 using a plurality of threaded double hex bolts 38. Inlet end plate 26 is configured to support a displacement sensor 88, an inlet temperature sensor 94, and an inlet pressure sensor 96. According to one construction, displacement sensor 88 comprises a linear variable differential transformer (LVDT) 90 that is carried by an LVDT support plate 92. According to one construction, temperature inlet sensor 94 comprises a thermistor. Similarly, an outlet pressure sensor 98 is carried on an inner surface of outlet end plate 28.

According to one suitable construction, LVDT 90 is a model MHR Schaevitz LVDT sensor sold by Measurement Specialties, Inc. (MSI), 710 Route 46 East, Ste. 206, Fairfield, N.J. 07004. Similarly, temperature inlet sensor 94 comprises a Model H-025-08-1 (Part No. 10K3D612) thermistor sold by BetaTHERM of Shrewsbury, Mass., and headquartered in Galway, Ireland. Furthermore, pressure sensors 96 and 98 each comprise a Model 85 Ultra Stable™ stainless steel pressure sensor manufactured and sold by Measurement Specialties, Inc. (MSI), 710 Route 46 East, Ste. 206, Fairfield, N.J. 07004.

FIG. 2 also illustrates the detailed construction and assembly of electronics enclosure assembly 12 which is secured atop valve body assembly 14 to form a valve housing assembly 11. As shown in FIGS. 2 and 4, electronics housing 30 is configured to form a substantially rectangular electronics cavity 102 within assembly 12. An electronics package 101 is physically attached to a bottom surface of electronics cavity 102 using four threaded fasteners 110 that are threaded into engagement with female threads provided within corresponding standoffs 118 that are threaded into the bottom surface of electronics cavity 102.

More particularly, electronics package 101 includes a motor driver printed circuit (PC) board 112 and a digital logic printed circuit (PC) board 116. Boards 112 and 116 are cared in spaced-apart relation using a plurality of tubular spacers 114 that are placed in coincidence within apertures at each of the four corners of each board 112 and 116 and configured to receive threaded fasteners 110 therethrough and into standoffs 118. Standoffs 118 are first secured within threaded female apertures within a bottom surface of electronics cavity 102. Standoffs 118 further include female threads sized to receive fasteners 110 at a topmost end for securing electronics package 101 within electronics cavity 102. Board 112 includes a pair of customer connectors 120 and 122 which will be discussed in greater detail below. Electronics 33 are provided on boards 112 and 116. Processing circuitry 126 is provided on boards 112 and 116. Additionally, a pair of powered diode wires 128 and 130 are provided.

Upon mounting electronics package 101 within electronics cavity 102, cover 32 is then secured atop housing 30 using a plurality of threaded cap screws 36 which are received through respective clearance through-bores 132 and cover 32. To facilitate sealing engagement of cover 32 to housing 30, an O-ring seal 108 is provided within a complementary receiving groove on the bottom of cover 32 positioned to mate with a top sealing surface 106 provided on housing 30 inboard of threaded bores 104 that receive threaded portions of cap screws 36, in assembly.

To complete assembly, product name plate 46, including product and manufacturing information printed or embossed thereon, is affixed atop cover 32 using a plurality of drive screws 48 that pass through holes 54 in plate 46 for threaded securement within corresponding threaded holes 55 provided in corresponding locations of cover 32.

Upon assembly, metering valve 10 of FIG. 2 is configured to receive fuel into flow inlet 20, meter such fuel by axially positioning flow tube 60 relative to seal 82 and flow diverter 78 of orifice plate assembly 52, and deliver fuel at a desired rate to a gas turbine engine via three flow apertures 84 that provide flow outlet 22. The fuel can be gas or liquid. Optionally, the metering valve can be used to deliver a mixture of fuel and air.

According to FIG. 3, a flow tube assembly 134 within metering valve 10 provides for precision fuel flow control over a wide flow range and within a very compact package size through axial displacement of flow tube 60 relative to seal 82 and flow diverter 78 of orifice plate assembly 52. By properly energizing wire windings 176 of motor winding assembly 172, electromagnetic force (EMF) lines of flux attract an armature 64 of flow tube assembly 134 towards a pole piece 162. By adjusting the duty cycle to wire windings 176, the position of armature 64 (as well as tube 60) can be varied such that a frustoconical portion of armature 64 is moved closer towards pole piece 162, thereby compressing coil spring 142. When windings 176 are not energized, coil spring 142 drives flow tube 60 into sealing engagement with seal 82 of orifice plate assembly 52, thereby completely shutting off flow through metering valve 10.

As shown in FIG. 3, armature 64 has a frustoconical portion that is shaped in complementary relation with pole piece 162 such that maximum attraction of pole piece 162 brings pole piece 162 into proximate nesting relation with the complementary frustoconical portion of armature 64, thereby moving flow tube 60 away from seal 82 so as to impart a maximum open dimension for flow gap 136. According to one design, flow gap 136 has a maximum value of one-quarter inch.

According to one construction, motor winding assembly 172 comprises a bobbin case 174 about which a 17-gauge wire is wound so as to provide wire windings 176. Motor winding assembly 172, when energized, generates electromagnetic force (EMF) lines of flux that attract armature 64 and compress spring 142 as wire windings 176 receive an adjusted level of current using a current control loop so as to adjust a duty cycle therethrough. The presence of wire windings 176 between motor housing 70 and pole piece 162 cooperates with armature 64 so as to provide appropriate lines of flux to attract the armature 64 to pole piece 162.

In order to determine the relative position of flow tube 60 and the width of circumferential flow gap 136, a displacement sensor 88 in the form of LVDT 90 detects the position of flow tube 60 relative to inlet end plate 26 in valve housing 24. Such relative displacement corresponds with the displacement of flow tube 60 relative to orifice plate 76 which corresponds with the dimension of flow gap 136. Accordingly, fuel is precisely delivered at a desired flow rate by way of flow inlet 20 to flow tube 60 and out through three flow apertures 84 that are provided through orifice plate 76, as flow tube 60 is spaced away a desired distance from seal 82 via actuation of linear motor 58 corresponding with a specific duty cycle being delivered to wire windings 176.

As shown in FIG. 3, LVDT 90 comprises a mechanically actuated core 166 that is carried by support plate 92 in fixed relation with flow tube 60. Accordingly, movement of flow tube 60 can be detected by movement of plate 92 and core 166 relative to coils within a cylindrical coil assembly (or transformer) 168. Movement of the mechanically actuated core 166 relative to assembly 168 changes reluctance of a flux path between a primary coil and a secondary coil of assembly 168, thereby generating an output signal related to displacement of flow tube 60. It is further understood that circuitry is provided for interfacing with LVDT sensor 90 within circuitry provided in electronics package 101 (of FIG. 2).

As shown in FIG. 3, in operation, displacement sensor 88 is configured to detect axial positioning of flow tube 60 relative to a central flow body provided by flow diverter 78 and seal 82 of orifice plate assembly 52. Fuel which is received upstream via flow inlet 20 passes downstream through flow tube 60, out and around circumferential flow gap 136, and out through three arcuate, circumferentially spaced-apart flow apertures 84 within orifice plate 76. Fuel leaving through flow apertures 84 thereby provide for flow outlet 22. Subsequently, the precisely metered fuel is delivered to an outlet supply pipe, such as outlet supply pipe 18 depicted in FIG. 1.

According to FIG. 3, flow diverter 78 is shaped such that the shape can determine the outlet characteristics, such as flow resolution, provided between flow tube 60, flow diverter 78, and seal 82 as fuel is delivered through flow apertures 84 into flow outlet 22. A threaded fastener 80, along with a lock washer, is received within an enlarged, recessed bore and a clearance bore in orifice plate 76, and into a threaded bore that is provided within flow diverter 78. Securement of threaded fastener 80 into the threaded bore retains flow diverter 78 onto orifice plate 76. An elevated shoulder is provided in flow diverter 78 and sized sufficiently to securely retain seal 82 in sealing engagement between flow diverter 78 and orifice plate 76 as fastener 80 is secured into flow diverter 78. Such construction enables a user to easily clean the valve and to change the shape of flow diverter 78. For example, an alternatively-shaped flow diverter can be substituted for flow diverter 78.

As shown in FIG. 3, flow tube 60 is carried for axial movement by linear motor 58 in slidable and sealing engagement at the input end and the output end with inlet end plate 26 and outlet end plate 28 of valve body assembly 14, respectively. More particularly, a dynamic seal 152 is provided adjacent the downstream end of flow tube 60, as shown in FIGS. 3 and 4. According to one construction, dynamic seal 152 is formed from a filled polytetrafluoroethylene (PTFE). Adjacent and upstream of seal 152, a circumferential bearing 154 is provided. According to one construction, bearing 154 comprises a Rulon™ J bearing. Bearing 154 facilitates axial fore and aft movement of flow tube 60 relative to outlet end plate 28; whereas seal 152 provides a sliding seal along the downstream end of flow tube 60 relative to outlet end plate 28.

Similarly, FIG. 3 further illustrates the seal and support components provided for flow tube 60 relative to inlet end plate 26. More particularly, a wiper seal 156 is provided adjacent an upstream end of flow tube 60 so as to provide a wiping seal between flow tube 60 and inlet end plate 26. Additionally, a dynamic seal 158 is provided downstream of wiper seal 156 to further facilitate a dynamic seal between flow tube 60 and inlet end plate 26. Furthermore, a circumferential bearing 160 is provided downstream of dynamic seal 158, between flow tube 60 and inlet end plate 26. Bearing 160 provides a sliding bearing surface to facilitate axial fore and aft motion of flow tube 60 relative to inlet end plate 26. According to one construction, dynamic seal 158 comprises a filled polytetrafluoroethylene (PTFE). According to one such construction, bearing 160 also comprises a Rulon™ J bearing.

As shown in FIG. 3, coil spring 142 is received within a cylindrical groove 170. Once flow tube 60 is moved to a maximum open-valve position for the metering valve, support plate 92 compresses spring 142 within cylindrical groove 170 to a maximum compressive position. Corresponding with such position, displacement sensor 88, here LVDT 90, detects such maximum open position by way of core 166 being displaced maximally within cylindrical coil assembly (or transformer) 168. When the flow tube is moved to a closed position for the valve assembly, plate 92 moves in a downstream direction as the motor is de-energized, thereby enabling coil spring 142 to drive flow tube 60 to a downstream position as plate 92 (which is circumferentially affixed to flow tube 60) pushes flow tube 60 into sealing and seating engagement with seal 82 at an opposite end. Hence, coil spring 142 ensures closure of the valve assembly when the linear motor is not energized. Hence, further benefit is provided in that the valve is closed when power is lost to the drive motor.

As shown in FIGS. 3 and 4, armature 64 has a cylindrical outermost portion that is contiguous with a frustoconical portion. However, a downstream end of armature 64 is undercut, as shown in FIGS. 3 and 4. Armature 64, as shown in FIG. 4, has female threads 202 that enable threaded engagement of armature 64 onto flow tube 60 via complementary, corresponding male threads 203 that are provided on flow tube 60. A circumferential shoulder 62 on flow tube 60 provides an affixation stop point for securing armature 64 in threaded engagement at a fixed location along flow tube 60, as shown in FIG. 4.

Additionally, a circumferential groove 140 is provided on the radial outermost portion of armature 64 (see FIG. 4) into which an O-ring 139 is first provided and on top of which a seal ring 138 is further provided. As shown in FIGS. 3 and 4, seal ring 138 forms a sliding piston-type seal with a bore 69 provided in motor housing 70. Armature 64 is further secured, after threading, onto flow tube 60 at a fixed position using threaded set screw 165 that is received within a threaded set screw hole 164 of armature 64. Set screw 165 is threaded into screw hole 164 until set screw 165 engages with an outer surface of flow tube 60, thereby fixing armature 64 at a desired location on flow tube 60.

The provision of seal ring 138 along cylindrical bore 69 provides a further advantage to the present metering valve.

According to one construction, seal ring 138 is made of polytetrafluoroethylene (PTFE). More particularly, seal ring 138 provides dampening of flow tube 60 as seal ring 138 and bore 69 cooperate to partition a pair of sealed air chambers 215 and 216 (see FIGS. 3 and 4) downstream and upstream of seal ring 138, respectively. As shown in FIG. 4, movement of armature 64 and seal ring 138 within cylindrical bore 69 provides compression and evacuation on respective opposite sides of seal ring 138 as armature 64 moves so as to change the relative volumes of air chambers 215 and 216. Such action imparts dampening to sudden motions of flow tube 60 within the metering valve which imparts benefits and stability to fuel flow control by the valve.

FIGS. 2 and 4 illustrate the provision of a temperature sensor in the form of a thermistor 94 which is provided adjacent an inlet (or upstream) end of flow tube 60 for measuring inlet temperature of fuel into flow tube 60 of metering valve 10. As shown in FIGS. 2 and 4, thermistor 94 is threaded for mounting into a threaded bore 250 provided in inlet end plate 26. As shown in FIG. 4, threaded bore 250 is in fluid communication with a temperature port 244 that communicates with an upstream end of flow tube 60 for detecting upstream temperature at flow tube 60. To facilitate manufacturing of temperature port 244, an enlarged port 246 is provided with a threaded female portion for receiving a threaded plug 148. Plug 148 is used to seal the radial outer end of threaded port 246 and to further facilitate cleaning and maintenance of port 244.

In addition to illustrating the position of thermistor 94 and temperature port 244, FIGS. 2, 3 and 4 further illustrate the positioning of an inlet pressure sensor 96 (see FIGS. 2, 3 and 4) and an outlet pressure sensor 98 (see FIGS. 2 and 4). The resulting detected temperature from thermistor 94 and pressures from pressure sensors 96 and 98 are utilized to calculate fuel flow delivery rates through metering valve 10 for both subsonic and sonic flow conditions.

Inlet pressure sensor 96 is received within a threaded bore 150 which communicates via the pressure port 144 with flow inlet 20. Pressure port 144 is formed similar to temperature port 244 wherein an enlarged threaded port 146 is first formed and in which a threaded plug 148 is provided to seal threaded port 146 and pressure port 144 after construction.

Similarly, outlet pressure sensor 98 is threaded into a similar threaded bore 350 which communicates with a pressure port 344. An enlarged threaded port 346 is used to facilitate construction of pressure port 344, after which another threaded plug 148 is threaded into sealing engagement therein.

In operation, temperature port 244 enables thermistor 94 to detect inlet temperature of fuel at flow inlet 20. Likewise, pressure port 144 enables inlet pressure sensor 96 to detect pressure of fuel at flow inlet 20. Finally, pressure port 344 enables outlet pressure sensor 98 to detect downstream pressure adjacent flow outlet 22, or adjacent to the downstream end of flow tube 60.

FIG. 4 illustrates the physical attachment of electronics enclosure assembly 12 to valve body assembly 14. More particularly, a pair of hollow bolts 204 and 206 are used to secure electronics enclosure assembly 12 to valve body assembly 14. Additionally, hollow bolts 204 and 206 facilitate the passage of wiring from sensors 94, 96 and 98 to electronics package 101 within electronics enclosure assembly 12. More particularly, wires 208 and 209 pass through hollow bolt 204; whereas wires 210 and solenoid wires 66 and 68 pass through hollow bolt 206. Each bolt 204 and 206 includes a circumferential outer groove 213 in which a helicoil lock 212 is provided to lock each bolt 204 and 206 into the respective threaded surfaces provided in valve housing 24.

Also shown in FIG. 4, a threaded fastener 214 is used to secure motor housing 70 together with pole piece 162. Two other threaded fasteners (not shown) are equally spaced circumferentially from threaded fastener 214 shown in FIG. 4.

As shown in FIGS. 1–4, metering valve 10 uses onboard sensors and digital electronics to automatically measure and control mass flow of fuel over a wide range of temperatures and pressures, as described below with reference to FIGS. 5–11. The actual fuel flow can be determined with onboard electronics based on feedback signals from sensors in the valve. The metering valve also uses integrated, 24-volt DC (VDC) digital electronics that contain additional inputs and outputs for allowing programmable flow control, closed-loop turbine control, and an array of other options. Analog interfaces are provided within the electronics housing which are user configurable as 4–20 mA (current) or 0–5 VDC (voltage). Real-time health and data monitoring of the metering valve can also be implemented through an isolated RS-232/RS-485 serial interface that enables a user to see mass flow, inlet and outlet pressures, gas temperature and diagnostics.

The flow tube construction for the metering valve is balanced. Additionally, the flow-through construction is self-cleaning. Even furthermore, the only moving part present within the valve is the moving core that is driven by a direct acting solenoid comprising the armature and flow tube. As a result, prior art techniques of utilizing pneumatics or hydraulics for actuating a valve are eliminated, and their concomitant tendency to leek and break down is eliminated from the design. A fail-safe closing spring along with an easy-to-clean soft seat provides a positive, leak-tight shutoff which further enhances the contamination-resistant design of the metering valve.

Under experimental tests, it has been determined that the present metering valve design results in improved flow performance because of its smooth, flow-through design. The metering valve has been found to have a 200:1 turndown ratio and a plus or minus one percent linearity, making such metering valve ideal for use with 1–10 megawatt gas turbines. Even furthermore, the electronics on the metering valve enable a user to program a maximum flow rate and relatively easily achieve such result by way of the incorporated sensors.

B. Control System and Method

Details of the valve control system and method of the present invention are disclosed below with reference to FIGS. 5–11. The control system uses both sonic and subsonic flow equations to control an exemplary turbine fuel metering valve (of FIGS. 1–4) in order to meet a mass fuel flow that matches a desired demand for a particular turbine engine. Such subsonic and sonic flow equations are implemented using a microcontroller such that the microcontroller can adjust valve fuel flow to match a flow control setpoint. The sensors previously described for measuring flow tube displacement, upstream pressure, downstream pressure, and upstream temperature provide data that is used as input values to the respective flow equations in order to determine valve fuel flow that matches a setpoint value.

Figure 5:
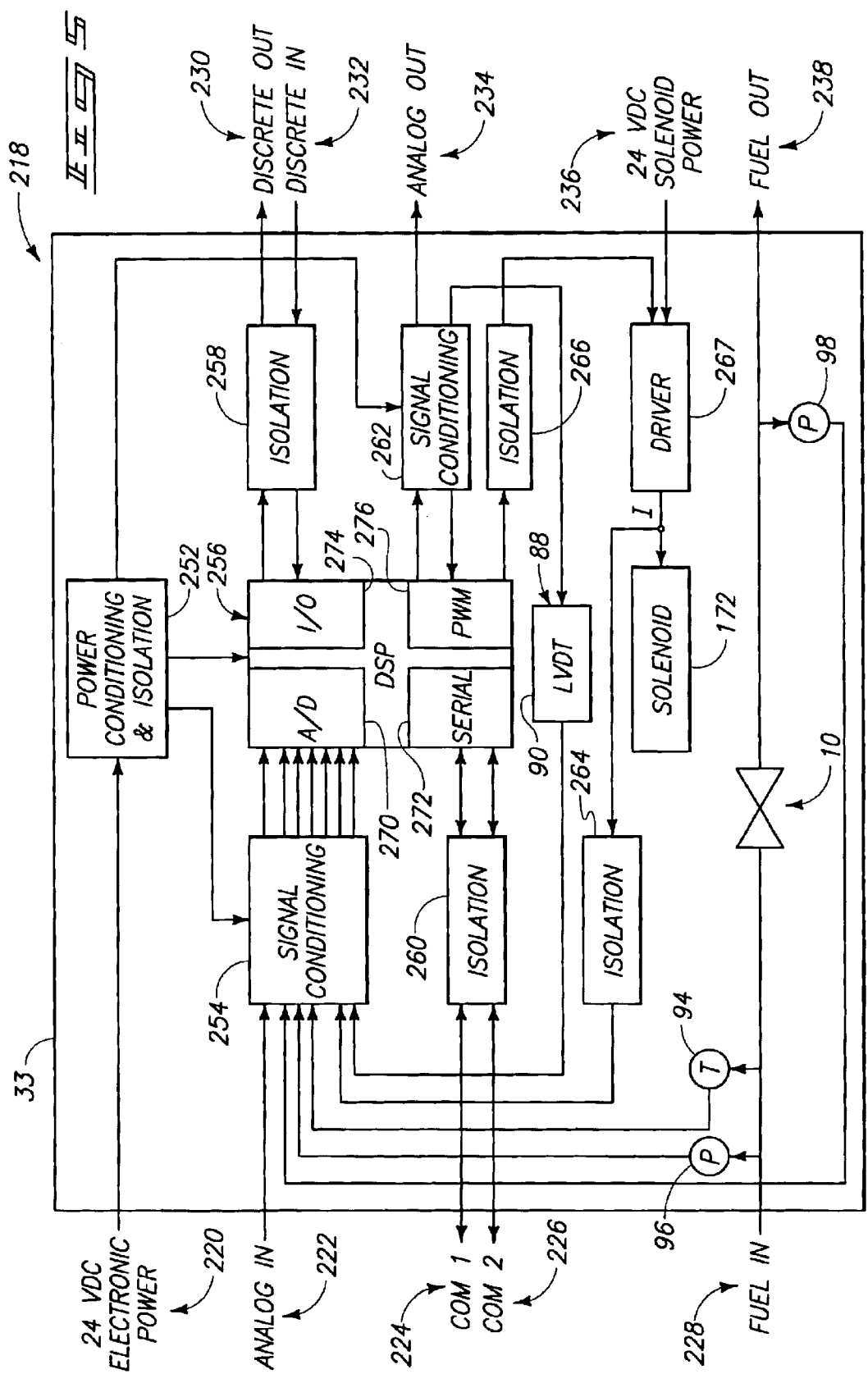
FIG. 5 is a schematic block diagram for the electronics and control system for the metering valve of FIGS. 1–4.

FIG. 5 illustrates electronics 33 forming an electronics system 218 that is provided within the electronics closure assembly of the metering valve described with reference to FIGS. 1–4. More particularly, electronics 33 cooperates to provide a control system for the metering valve which includes a 24-volt DC (VDC) electronic power supply line 220. Power supply line 220 delivers a supply of 24 VDC nominal (16V to 32V) input power with a reverse voltage protection. A four-amp (A) maximum power supply current is provided at 16 volts (V), or 64 watts.

Analog inputs 222 are also provided to electronics 33. The analog inputs 222 form part of an analog interface, in combination with analog outputs 234. Analog inputs 222 comprise software selectable inputs ranging from zero to 20 mA, and zero to 5 volts DC, or variations thereof. The analog outputs 234 comprise software selectable outputs that range from minus 20 to 20 mA, and minus 5 to 5 volts DC, or variations thereof. A first communication port 224 and a second communication port 226 each include communication links that are coupled with an isolated, 16-bit RS-232/RS-485 serial communications interface 272 by way of isolation circuitry 260. Serial communication interface 272 is provided on digital signal processor (DSP) 256. Isolation circuitry 260 provides 500 volt AC (714 Vdc) isolation between the case and signal wires provided by communications ports 224 and 226.

A fuel inlet 228 provides fuel to metering valve 10 and a fuel outlet 238 delivers the metered fuel in response to operation of electronics 33 which serve to regulate operation of metering valve 10 by operation of solenoid 172. As shown in FIG. 5, metering valve 10 is shown in a simplified schematic form, separated from solenoid 172. However, it is understood that the associated mechanical components are provided together. Simplified representations of fuel inlet 228, fuel outlet 238, and metering valve 10 are depicted herein in order to show their relationship relative to the accompanying electronics 33.

Discrete outputs 230 and discrete inputs 232 are provided in association with isolation circuitry 258 for communication with an input/output (I/O) interface 274. Outputs 230 and inputs 232 comprise optional discrete inputs and outputs. Discrete outputs 230 comprise solid state relay outputs. Discrete inputs 232 comprise optocoupler inputs.

A 24-volt DC (VDC) solenoid power supply 236 supplies power to a solenoid driver 267 for driving solenoid 172. Additionally, power conditioning and isolation circuitry 252 conditions and isolates power from power supply 220 for delivery to signal conditioning circuitry 254, DSP 256, and signal conditioning circuitry 262.

Signal conditioning circuitry 254 conditions input signals for delivery to analog-to-digital (A/D) interface 270 of DSP 256. Similarly, signal conditioning circuitry 262 serves to condition signals from pulse width modulator (PWM) 276 for delivery to PWM 276, to analog output 234, and to displacement sensor 88 (or LVDT 90).

Isolation circuitry 266 conditions signals from PWM 276 for delivery to driver 267. Similarly, isolation circuitry 264 conditions signals from downstream of driver 267 for delivery to signal conditioning circuitry 254. Solenoid driver 267 is a high current solenoid driver.

As shown in FIG. 5, an inlet pressure sensor 96 measures upstream pressure, and an inlet temperature sensor 94 measures upstream temperature. Likewise, an outlet pressure sensor 98 measures downstream pressure, relative to metering valve 10.

DSP 256 is a Model No. TMS320F2810 manufactured by Texas Instruments. DSP 256 has a 32-bit central processing unit (CPU), with 6.67 nanosecond minimum instruction time, 150 MHz clock speed, 64K by 16 Flash memory, 18K by 16 internal SRAM memory, multiple instruction processing (4 level pipeline), and a watchdog timer.

DSP 256 has a 12 bit analog-to-digital converter (ADC) with 16 channels. There are two sample-and-hold blocks and a 2 by 8 channel input multiplexer. There are two asynchronous serial communication interfaces (SCIs), a synchronous serial peripheral interface (SPI), an enhanced controller area network (eCAN), and two event manager modules.

Software and firmware design for the metering valve control system benefits from several software features. First, the valve is configured to be run in multiple modes of operation: a stroke mode, a flow control mode, a flow measurement mode, and a flow limiting mode. Secondly, the processing speed of the DSP (150 MHz) enables fast flow and control calculations. Finally, C/C++ programming language is used for the software which allows for faster software development, provides floating point math functions, and eases software maintenance.

Figure 6:
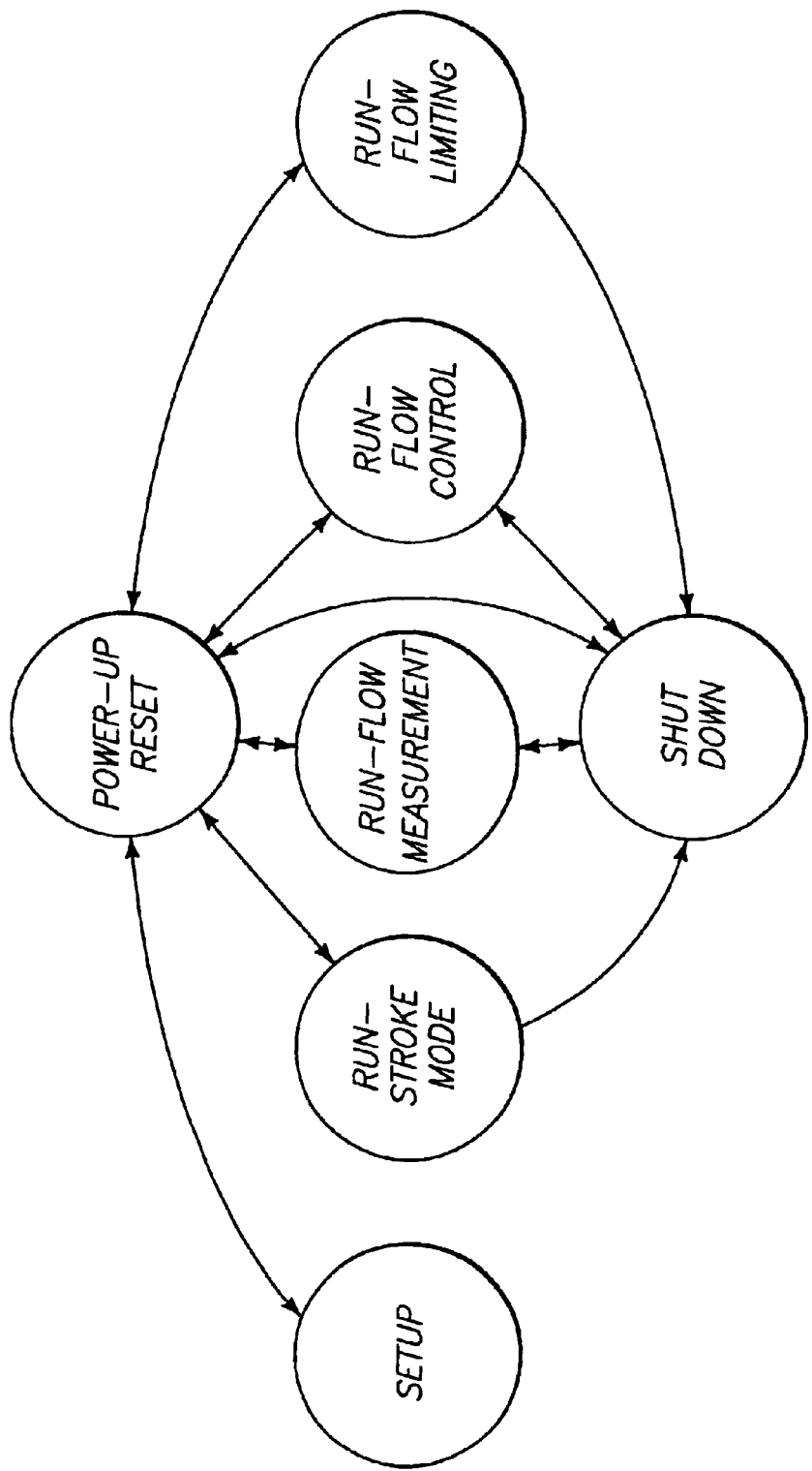
FIG. 6 is a state machine diagram for the metering valve of FIGS. 1–5.

FIG. 6 illustrates software states for the metering valve control system of the present invention. More particularly, a "POWER-UP/RESET" state is configured to initialize the digital signal processor (DSP) and associated peripherals (such as the LVDT, solenoid driver, solenoid, and circuitry). Additionally, this state performs device tests and data integrity tests. Furthermore, this state transitions to the "SETUP" state, but only if a Setup Command is received.

A "RUN" state corresponds with four operating modes: a "Run-Stroke Mode", a "Run-Flow Measurement Mode", a "Run-Flow Control Mode", and a "Run-Flow Limiting Mode". The "Run-Stroke Mode" corresponds with standard metering valve operation. The "Run-Flow Measurement Mode" corresponds with sensor-based determination of flow using flow equations. The "Run-Flow Control Mode" corresponds with position demand being used to set a desired flow. The "Run-Flow Limiting Mode" corresponds with position demand being used to set desired flow limited by turbine acceleration/deceleration tables.

A "SHUTDOWN" state is entered as a result of critical faults where a selected "RUN" state cannot continue. The "SHUTDOWN" state transitions back to the "RESET" state by way of a power cycle.

A "SETUP" state is configured to set an operating mode for the metering valve to a stroke mode, a flow measurement mode, a flow control mode, or a flow limiting mode. The "SETUP" state also enables the setting of gas parameters for the fuel being delivered by the valve. Additionally, identification information and flow control loop parameters can be set. Finally, a user can exit the "SETUP" state only by using a reset command, according to one implementation.

Several control system interrupts are used on the circuitry and software for the metering valve. More particularly, an ADC interrupt is provided to read all A/D inputs and to serve as a main timer interrupt. An SCI transmit interrupt is provided to transmit RS-232/RS-485 serial data. An SCI receive interrupt is provided to receive RS-232/RS-485 serial data.

System timing is used to handle the ADC interrupt and several tasks. First, the ADC interrupt is executed every 12.5 microseconds at an 80 KHz rate, and serves as a timer interrupt. The ADC interrupt sets event flags to execute foreground tasks, and the execution time is 1.47 microseconds. Secondly, an LVDT position task is executed every 100 microseconds at a 10 KHz rate. The LVDT position task is called by the ADC interrupt, and execution time is 0.63 microseconds. Thirdly, a current control task is executed every 100 microseconds at a 10 KHz rate. The current control task runs in the foreground when the event flag is set, and execution time is 100 microseconds. Fourth, a position control task is executed every 100 microseconds at a 10 KHz rate. The position control task runs in the foreground when an event flag is set, and execution time is 100 microseconds. Fifth, a flow control task is executed every 20 milliseconds at a 50 Hz rate. The flow control task runs in the foreground when an event flag is set. An estimate of the flow measurement execution time is 24 microseconds, and an estimate of the flow control execution time is 12 microseconds. Finally, a temperature task is executed every 819 milliseconds at a 1.2 Hz rate. The temperature task runs in the foreground when an event flag is set, and an estimated execution time is 16 microseconds.

FIGS. 7–11 illustrate logic flow for the control algorithms implemented via the control system for the metering valve of FIGS. 1–5. More particularly, proportional-integral-differential (PID) control loops include a flow control PID loop, a position control PID loop, and a current control PID loop. Additionally, algorithms include a flow measurement algorithm, a flow control algorithm, and an ADC input conditioning algorithm.

Figure 7:
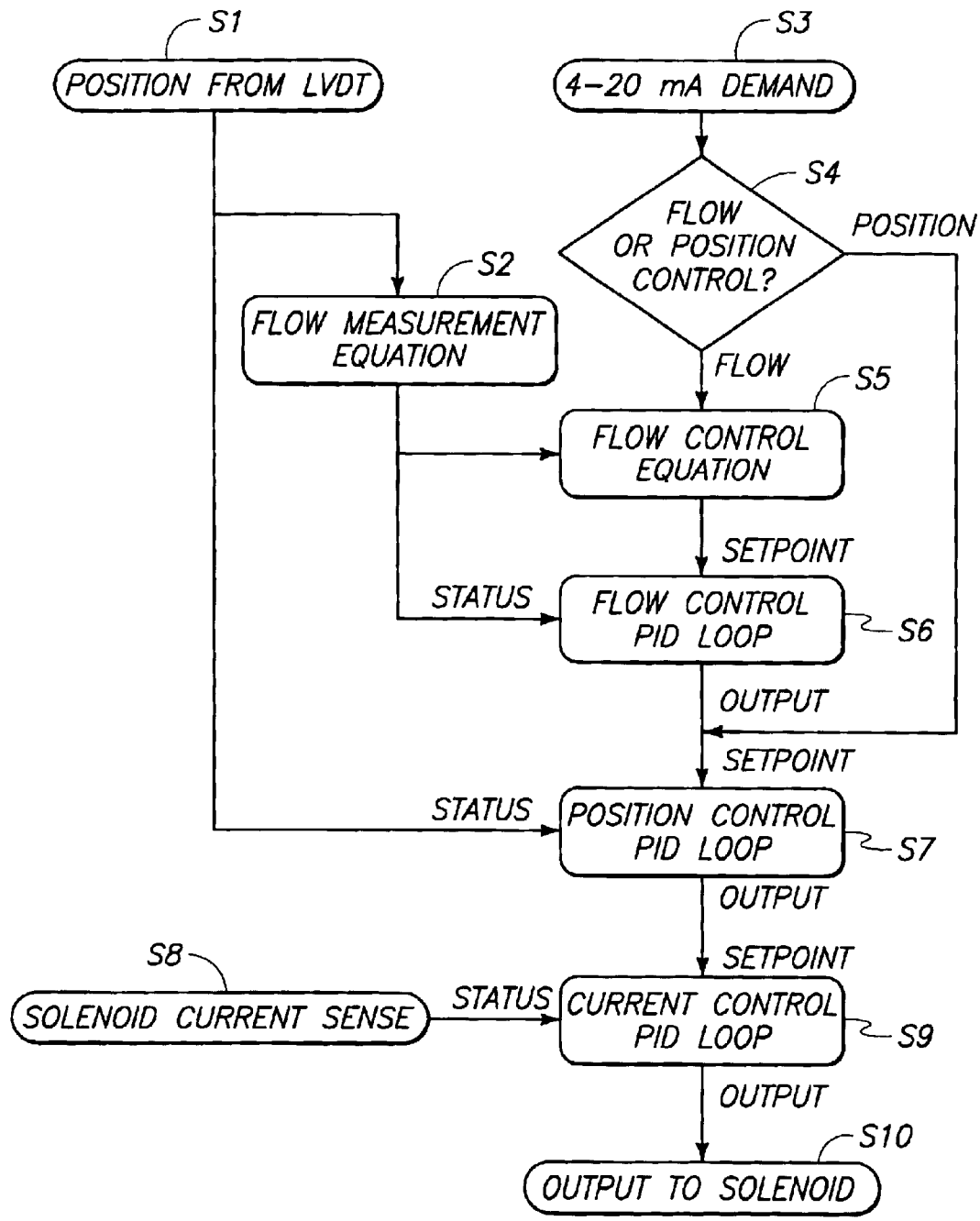
FIG. 7 is a proportional-integral-differential (PID) loop control diagram for controlling the metering valve of FIGS. 1–5.

FIG. 7 illustrates the logic flow for the PID loop control. Step "S1" represents the displacement position of the metering tube in the metering valve as measured from the LVDT. Step "S1" provides inputs to Steps "S2" and "S7". Step "S2" represents the flow measurement equation used to calculate flow corresponding to the detected position from the LVDT. Step "S3" proceeds to Step "S4". Step "S3" represents 4–20 milliamp demand as a setpoint input. Step "S4" represents a decision diamond that queries whether the desired control is flow control or position control. When flow control is desired, the process proceeds to Step "S5". When position control is desired, the process proceeds to Step "S7". In Step "S5", a flow control equation is implemented, as described below in greater detail with reference to sonic and subsonic flow conditions. After performing Step "S5", the process proceeds to Step "S6".

In Step "S6", a flow control PID loop is implemented. The flow control PID loop controls valve flow, has a setpoint input of 4–20 milliamp (0–5 VDC) demand input, and has a status input in the form of a flow measurement equation for both sonic and subsonic flow conditions. The flow control PID loop provides an input to the position control loop PID of Step "S7". The flow control PID loop uses fixed point math in order to enhance operating speed.

In Step "S7", a position control PID loop is implemented in order to control position of the flow tube within the metering valve. The position control PID loop receives one of two setpoint inputs, depending on the operating mode: first, a flow control PID loop output is received for a flow control mode; and second, a 4–20 milliamp demand input is received for a stroke mode. Additionally, a status input is received by the position control PID loop comprising a detected position from the LVDT. The position control PID loop generates an output that provides a solenoid current PID loop input for Step "S9". The position control PID loop uses fixed point math which enhances speed. After performing Step "S7", the process proceeds to Step "S8".

In Step "S8", solenoid current is sensed. After performing Step "S8", the process proceeds to Step "S9".

In Step "S9", a current control PID loop is implemented in order to manage drive current to the solenoid of the metering valve. The current control PID loop receives a set-point input comprising the position control PID loop output. The current control PID loop also receives a status input comprising a solenoid current sense input signal. The current control PID loop generates an output to the solenoid, represented as Step "S10". The current control PID loop also used fixed point math in order to maximize speed of operation.

Figure 8:
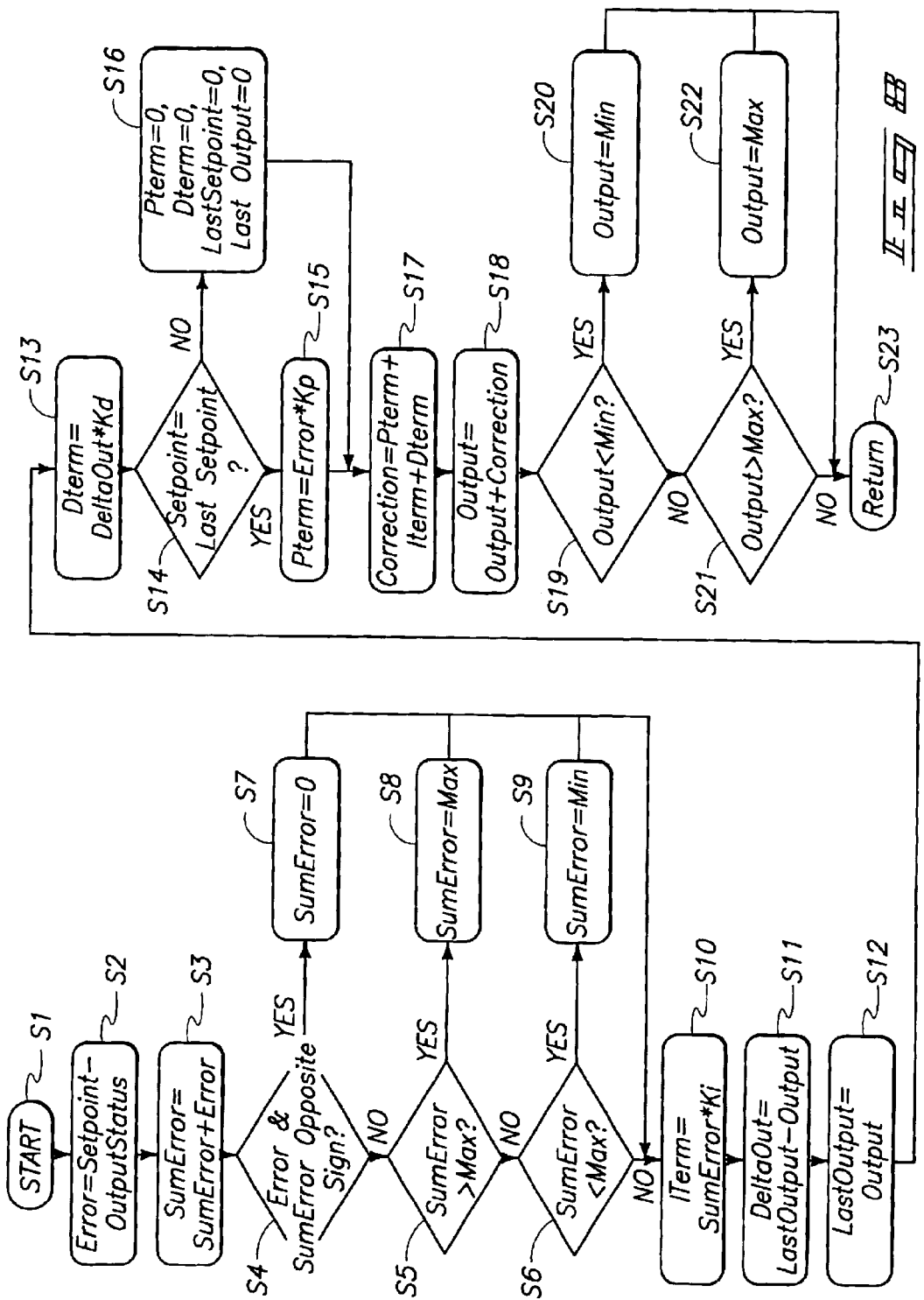
FIG. 8 is a flowchart illustrating steps in a proportional-integral-differential (PID) loop control algorithm for controlling the metering valve of FIGS. 1–5.

FIG. 8 illustrates a logic flow diagram for implementing a proportional-integral-derivative (PID) loop algorithm for carrying out Steps "S6", "S7", and "S9", of FIG. 7. More particularly, Steps "S1" through "S23" detail one suitable PID control loop algorithm usable to implement the PID loop functionality of Steps "S6", "S7", and "S9" of FIG. 7.

A proportional integral and derivative (PID) control system is illustrated with reference to FIG. 8. More particularly, the control process starts with Step "S1". In Step "S2", a reverse acting control loop is implemented wherein error equals setpoint minus output status (or measurement). In Step "S3", SumError equals plus Error. Steps "S4"–"S9" define a proportional band that provides the amount an input would have to change in order to cause output to move from zero to 100%, or vice-versa.

In Step "S10", an integral term is defined. In Step "S11", a DeltaOut term is defined. In Step "S12", a LastOutput term is defined. Furthermore, in Step "S13" a differential term (Dterm) is defined.

Step "S14" provides a decision tree wherein, if the setpoint equals the last setpoint, the process proceeds to Step "S15". If not, the process proceeds to Step "S16". In Step "S15", the proportional term (Pterm) is defined. In Step "S16", the proportional term, the differential term, the last setpoint, and the last output are all set to zero. In Step "S17", a correction is equated with the proportional term, the integral term, and the differential term, which are added together. In Step "S18", the output is set equal to the output plus a correction as determined in Step "S17".

Step "S19" defines a decision tree wherein, if output is below a minimum, the process proceeds to Step "S20". If output is not below a minimum, the process proceeds to Step "S21". In Step "S20", output is set equal to a minimum. In Step "S21", a decision tree queries whether the output is greater than a maximum. If the output is greater than a maximum, the process proceeds to Step "S22". If not, the process proceeds to Step "S23" and returns to start at Step "S1". In Step "S22", the output is set to a maximum value and then proceeds to Step "S23" and returns to start at Step "S1".

Figure 9:
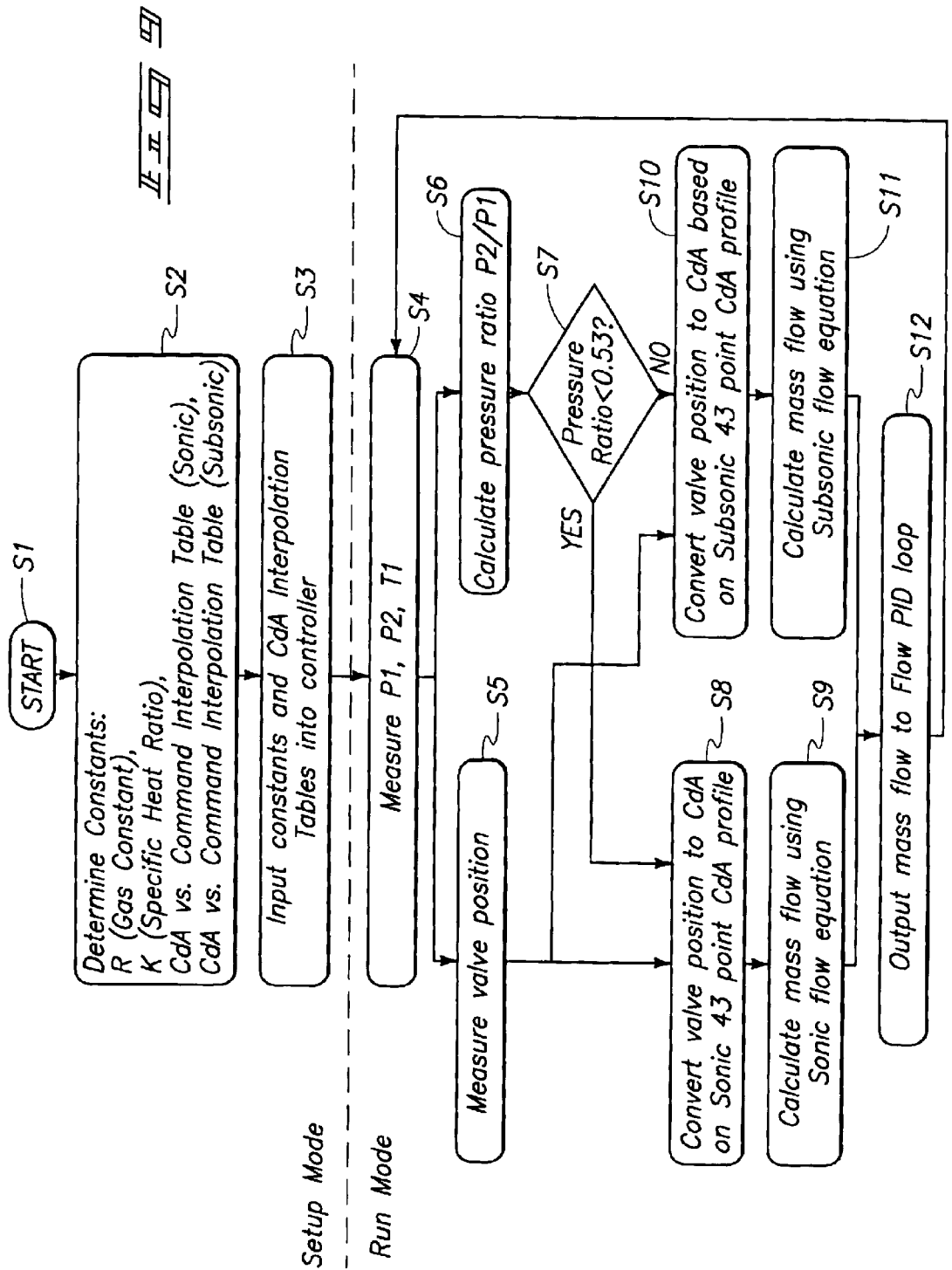
FIG. 9 is a flowchart illustrating steps in a flow measurement algorithm for measuring flow through the metering valve of FIGS. 1–5.

FIG. 9 illustrates a flow measurement algorithm for the flow control system and metering valve described previously. Flow measurement is measured by use of an equation in order to calculate mass flow through an orifice. Flow control and flow measurement algorithm details are provided in a subsequent section, below. As shown in FIG. 1, flow measurement is implemented at Step "S1", where it is initiated. After Step "S1", the process proceeds to Step "S2" wherein particular constants R (gas constant), K (specific heat ratio), sonic tables, and subsonic tables for coefficient discharge times area versus command interpolation tables are provided. After performing Step "S2", the process proceeds to Step "S3". In Step "S3", the determined constants and the coefficient of discharge times area interpolation tables are input into the controller. In summary, Steps "S1" through "S3" provide a setup mode.

Subsequent to performing Step "S3", the process proceeds to a run mode at Step "S4". More particularly, Step "S4" entails measuring P1 (upstream pressure), P2 (downstream pressure), and T1 (upstream temperature). After performing Step "S4", the process proceeds to Step "S5" and Step "S6".

In Step "S5", valve position is measured using the LVDT. After performing Step "S5", the process proceeds to Step "S8" and Step "S10".

In Step "S6", a pressure ratio of output pressure over input pressure is calculated. After performing Step "S6", the process proceeds to a decision tree at Step "S7". In Step "S7", if a pressure ratio (P2/P1) is less than 0.53, the process proceeds to Step "S8". If not, the process proceeds to Step "S10".

In Step "S8", valve position is converted to a coefficient of discharge times area on a sonic, 43-point coefficient of discharge times area of profile. After performing Step "S8", the process proceeds to Step "S9".

In Step "S9", mass flow is calculated using a sonic flow equation as detailed below.

After performing Step "S9", the process proceeds to Step "S12".

In Step "S12", mass flow is output to a flow proportional-integral-differential (PID) loop, as previously detailed with reference to FIG. 8. After performing Step "S12", the process proceeds back to Step "S4".

In Step "S10", valve position is converted to a coefficient of discharge Ames area based on a subsonic, 43-point coefficient of discharge times area of profile. After performing Step "S10", the process proceeds to Step "S11".

In Step "S11", mass flow is calculated using the subsonic flow equations as identified below. After performing Step "S11", the process proceeds to Step "S12".

In Step "S12", mass flow is output to the flow PID loop, as previously described, and the process then returns back to Step "S4".

Figure 10:
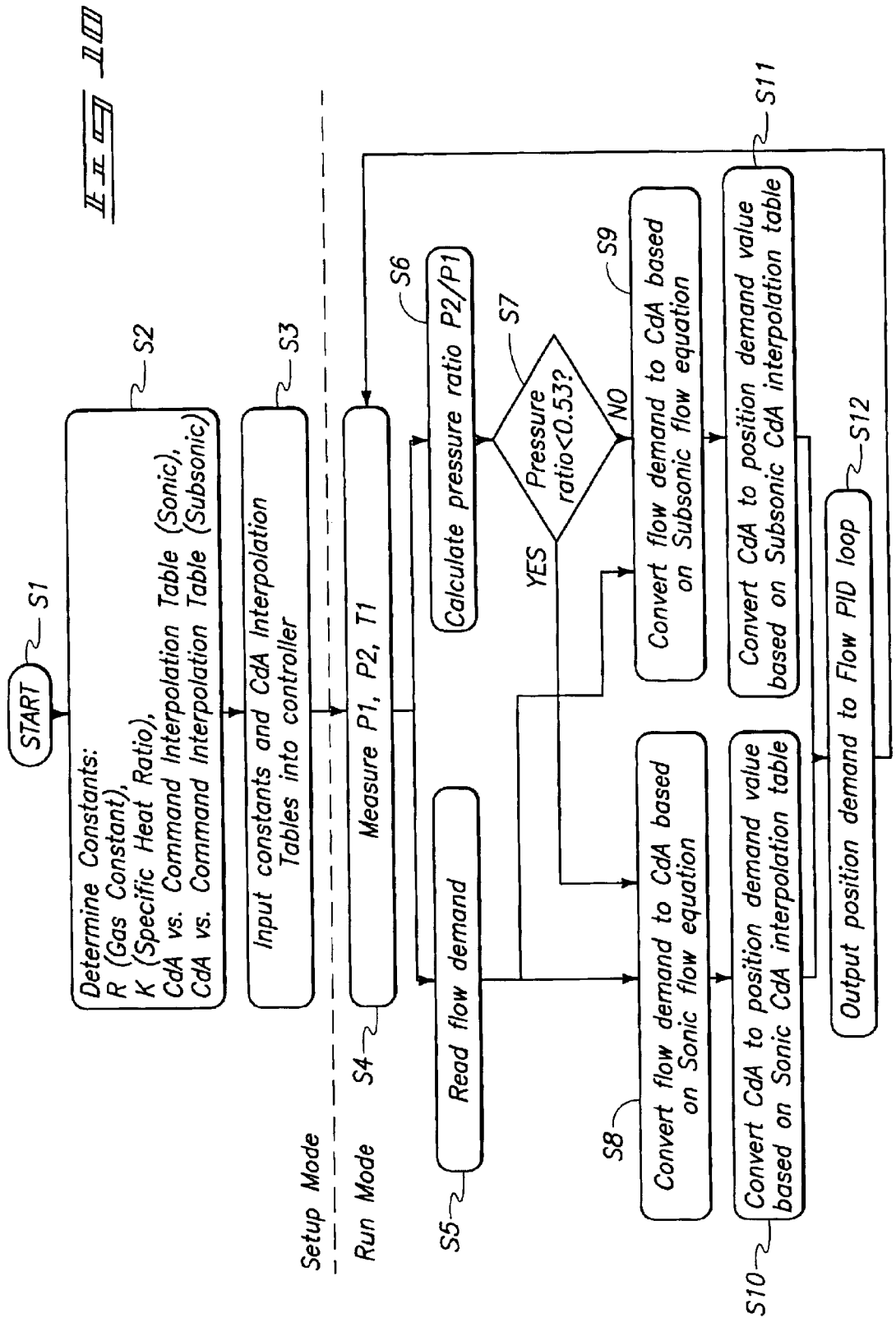
FIG. 10 is a flowchart illustrating steps in a flow control algorithm for controlling flow through the metering valve of FIGS. 1–5.

FIG. 10 illustrates the process steps for a flow control algorithm usable with the control system metering valve of the present invention. The process starts at Step "S1". After performing Step "S1", the process proceeds to Step "S2".

In Step "S2", the values for constants R. K, coefficient of discharge times area versus command interpolation tables for sonic and subsonic conditions, are determined. After performing Step "S2", the process proceeds to Step "S3".

In Step "S3", the determined constants and the coefficient of discharge times area interpolation tables are input into the controller for the metering valve. Steps "S1" through Step "S3" provide a setup mode.

Step "S4" initiates a run mode for flow control of the valve. In Step "S4", upstream pressure, downstream pressure, and upstream temperature are measured. After performing Step "S4", the process proceeds to Step "S5" and to Step "S6".

In Step "S5", flow demand is read. After performing Step "S5", the process proceeds to Step "S8" and Step "S9".

In Step "S6", the pressure ratio of output pressure over input pressure is calculated. After performing Step "S6", the process proceeds to a decision tree at Step "S7". If the calculated ratio pressure is less than 0.53, the process proceeds to Step "S8". If not, the process proceeds to Step "S9".

In Step "S8", flow demand is converted to a coefficient of discharge times area based on the sonic flow equations identified below. After performing Step "S8", the process proceeds to Step "S10".

In Step "S10", the coefficient of discharge area is converted to a position demand value based on the sonic coefficient of discharge times area interpolation tables. After performing Step "S10", the process proceeds to Step "S12".

In Step "S9", flow demand is converted to a coefficient of discharge area based on the subsonic flow equation as identified below. After performing Step "S9", the process proceeds to Step "S11".

In Step "S11", the coefficient of discharge times area is converted to a position demand value based on the subsonic coefficient of discharge times area interpolation tables. After performing Step "S11", the process proceeds to Step "S12".

In Step "S12", position demand is output to the flow proportional-integral-differential (PID) loop, as identified in FIG. 8. After performing Step "S12", the process proceeds back to Step "S4".

Figure 11:
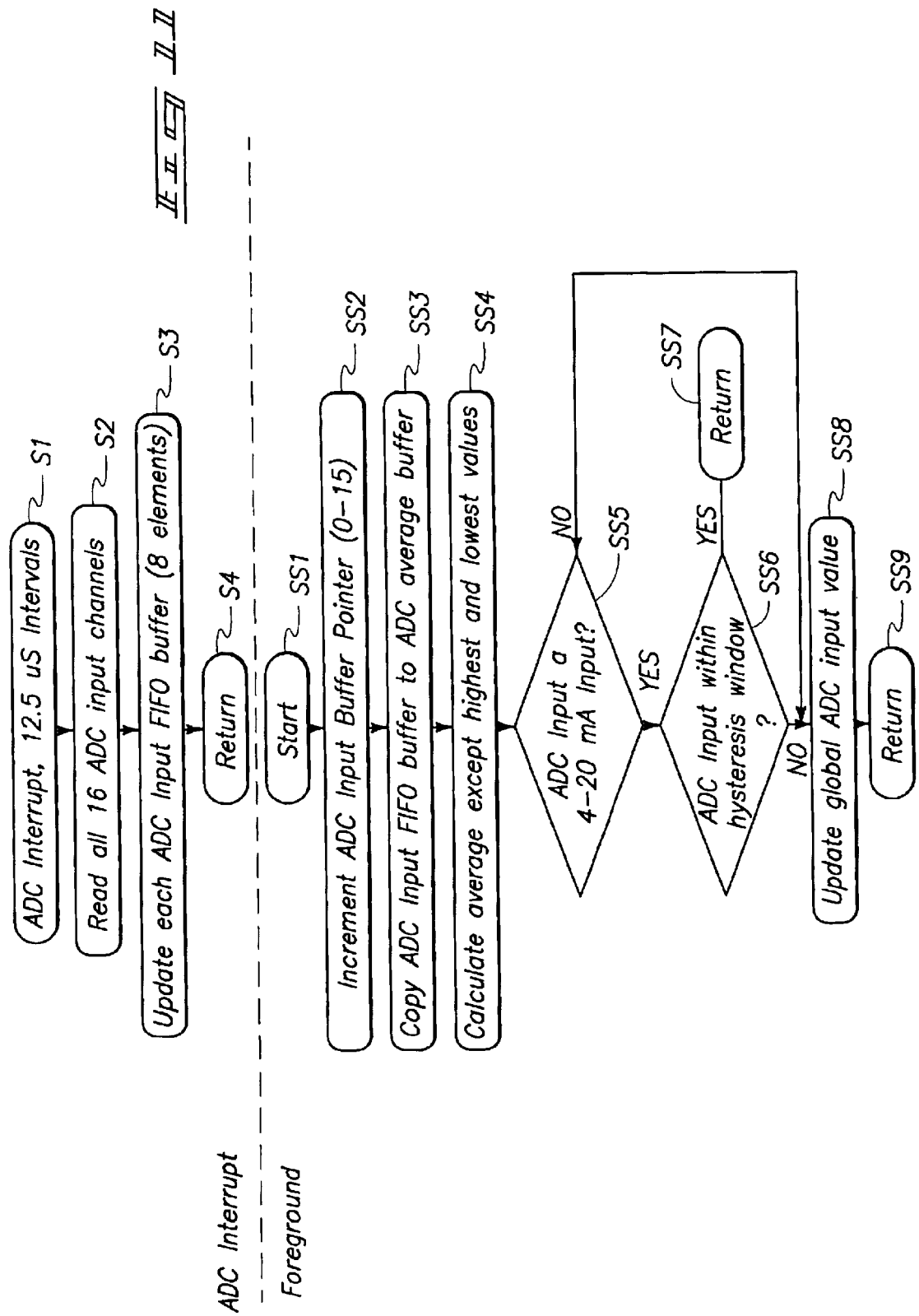
FIG. 11 is a pair of flowcharts illustrating steps for an analog-to-digital converter (ADC) interrupt and foreground operations for ADC input conditioning for the digital signal processor (DSP) of the control system for the metering valve of FIGS. 1–5.

FIG. 11 illustrates analog to digital converter input conditioning implemented with the control system. More particularly, Step "S1" entails an analog to digital converter (ADC) interrupt with 12.5 microsecond intervals. After performing Step "S1", the process proceeds to Step "S2".

In Step "S2", all 16 ADC input channels are read. After performing Step "S2", the process proceeds to Step "S3".

In Step "S3", each ADC input FIFO buffer is updated, with each having eight elements. After performing Step "S3", the process proceeds to Step "S4" and returns to normal operation. Steps "S1" through "S4" provide an ADC interrupt.

Also in FIG. 11, a foreground operation is provided starting with Step "SS1". After performing Step "SS1", the process proceeds to Step "SS2".

In Step "SS2", an ADC input buffer pointer is incremented from values ranging from zero to 15. After performing Step "SS2", the process proceeds to Step "SS3".

In Step "SS3", the ADC input FIFO buffer is copied to the ADC average buffer. After performing Step "SS3", the process proceeds to Step "SS4".

In Step "SS4", an average value is calculated, except highest and lowest values are excluded. After performing Step "SS4", the process proceeds to a decision tree at Step "SS5". If the ADC input is in the range of a 4–20 milliamp input, the process proceeds to the decision of Step "SS6". If not, the process proceeds to Step "SS8".

In Step "SS6", query is raised whether the ADC input is within a hysteresis window. If the ADC input is within a hysteresis window, the process proceeds to Step "SS7" and returns to a normal operation. If not, the process proceeds to Step "SS8".

In Step "SS8", a global ADC input value is updated. After performing Step "SS8", the process proceeds to Step "SS9".

In Step "SS9", the process returns to a normal operating mode.

C. Logic Flow Equations

In order to implement flow control, the metering valve meters mass flow of fuel according to demand. More particularly, the demand signal is proportional to flow. For purposes of implementation, 4 milliamps (13,127 counts) is defined as zero mass flow, corresponding with the valve being closed. Additionally, 20 milliamps (65,636 counts) is defined as maximum flow, corresponding with the valve being fully open. The maximum flow is user selected using set-up software prior to installation. According to an optional implementation, if a discrete RUN command is enabled, the valve will begin controlling flow. As the demand increases, the micro-controller determines the flow control set point, converting analog demand to digital count set point. The micro-controller then adjusts valve fuel flow to match the set point. The following flow algorithms are used:

Sonic Flow Conditions: Pup/Pdown>2

$$\dot{M} = 3600 * Pup * CdA * \sqrt{\frac{KGc}{ZRT}} * \left(\frac{2}{K+1}\right)^{\frac{K+1}{2(K-1)}}$$

$\dot{M}$ = mass flow rate (lbm/hr)

Pup = Upstream Pressure (psia)

Cd = Coefficient of discharge

Z = Compressibility factor

R = Gas Constant (ft-lbf/lbm-R)

-continued

T = Gas Temp (R)

K = Specific Heat Ratio (Cp/Cv)

A = Metering Area (in^2)

$$Gc = \text{Gravitational Constant}\left(32.2\frac{ft}{\sec.^2}\right)$$

Subsonic Flow Conditions: Pup/Pdown<2

$$\dot{M} = 3600 * CdA * \sqrt{\frac{2KGc}{R(K-1)}} * \left(\frac{Pup}{\sqrt{T}}\right) * \left(\frac{Pdown}{Pup}\right)^{\frac{1}{K}} * \sqrt{1 - \left(\frac{Pdown}{Pup}\right)^{\left(\frac{K-1}{K}\right)}}$$

$\dot{M}$ = mass flow rate (lbm/hr)

Cd = Coefficient of discharge

A = Metering Area (in^2)

K = Specific Heat Ratio (Cp/Cv)

$$Gc = \text{Gravitational Constant}\left(32.2\frac{ft}{\sec.^2}\right)$$

Pup = Upstream Pressure (psia)

Pdown = Downstream Pressure (psia)

T = Gas Temp (R)

Pup, Pdown and T are analog inputs provided to the DSP via on-board upstream and downstream pressure transducers and an upstream gas temperature thermistor. Z, R and K are constants that vary from depending on gas fuel medium. These values shall be set in on board, non-volatile memory (EEPROM). Cd and A are functions of valve position, the product of which forms the "effective" metering area. Therefore, a tabular Cd*A (or CdA) vs. valve position table shall be set in on board, non-volatile memory (EEPROM).

FIG. 12 illustrates one experimental test result for realizing flow demand using the valve and valve control system of FIGS. 1–11 in order to calculate flow as a turbine is ramped up from a starting condition over time with increasing speed to a final idle position (shown on the right hand of the abscissa). Plot 300 illustrates an experimentally determined fuel flow that was measured continuously from startup to idle using a Coriolis meter. Plot 302 illustrates flow that was calculated using the techniques described with reference to FIGS. 1–11 wherein four sensors were used instead of using a flow feedback device in order to calculate flow without using a relatively expensive flow detector.

As shown in FIG. 12, plot 300 shows a natural frequency for the Coriolis meter slightly later in time than 12:23. The ordinate (or y axis) shows a unit measure (pounds per hour) of fuel delivered. As can be seen from FIG. 12, plot 302 (the present invention) very closely mirrors the performance of plot 300 which was detected using a relatively expensive Coriolis meter as a flow-measuring device which operates the system as a closed loop. The results of such experimental test indicate close performance for the present flow system and method, while eliminating the relatively expensive addition of a flow-measuring device, such as a relatively expensive Coriolis meter. Furthermore, the Coriolis meter reduced an extraneous artifact that occurred at a natural frequency of the meter, as depicted in FIG. 12. Such an artifact is undesirable and could affect calculated flow performance.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A turbine valve control system, comprising:
    a variable flow metering device capable of meeting a plurality of predetermined mass flow rates by varying positioning of the flow metering device;
    a first sensor for detecting variable positioning of the flow metering device and generating a first output signal that is a function of the positioning of the flow metering device;
    a second sensor for detecting fluid pressure upstream of the flow metering device and generating a second output signal that is a function of the detected upstream fluid pressure;
    a third sensor for detecting fluid pressure downstream of the flow metering device and generating a third output signal that is a function of the detected downstream fluid pressure;
    a fourth sensor for detecting temperature upstream of the flow metering device and generating a fourth output signal that is a function of the detected temperature;
    memory including first computer program code for calculating a combined coefficient of discharge times area that gives a desired flow for a given valve position, upstream pressure, downstream pressure, and temperature for subsonic flow and second computer program code for calculating a combined coefficient of discharge times area that gives a desired flow for a given valve position, upstream pressure, and temperature for sonic flow; and
    processing circuitry configured to receive the signals, determine whether flow is subsonic or sonic, and implement a corresponding one of the first and second computer program codes to calculate a combined coefficient of discharge times area that will generate a desired mass flow rate for the flow metering device.

2. The turbine valve control system of claim 1 wherein the variable flow metering device has a known coefficient of discharge and flow area.

3. The turbine valve control system of claim 2 wherein the memory includes a lookup table of coefficient of discharge times area versus positioning of the flow metering device and the processing circuitry is configured to calculate mass flow rate through the flow metering device.

4. The turbine valve control system of claim 1 wherein the valve comprises a coaxial flow valve having a metering tube axially positioned relative to a flow diverter to regulate mass flow rate.

5. The turbine valve control system of claim 4 wherein varied positioning of the flow metering device comprises axial stroke of the metering tube.

6. The turbine valve control system of claim 1 wherein the variable flow metering device comprises a flow member configured for variable positioning within the flow metering device to vary mass flow rate through the flow metering device.

7. The turbine valve control system of claim 1 wherein the variable flow metering device includes a variable geometry orifice configured to produce variable mass flow rates by varying the degree of restriction at the orifice.

8. The turbine valve control system of claim 7 wherein the first computer program code and the second computer program code each calculate mass flow rate through the orifice of the variable flow metering device for subsonic flow and sonic flow, respectively.

9. The turbine valve control system of claim 1 wherein the coefficient of discharge and the flow area are each functions of position of the flow metering device.

10. The turbine valve control system of claim 9 wherein flow area and coefficient of discharge are proportionally related.

11. The turbine valve control system of claim 9 further comprising a first look-up table of coefficient of discharge times area versus position of the flow metering device for subsonic flow and a second look-up table of coefficient of discharge times area versus position of the flow metering device for sonic flow.

12. The turbine valve control system of claim 11 wherein the processing circuitry is configured to convert a determined flow demand to a coefficient of discharge times area based at least in part on one of a sonic flow equation and a subsonic flow equation.

13. The turbine valve control system of claim 12 wherein one of the first and second lookup tables is used to convert a specific coefficient of discharge to a corresponding position of the flow metering device.

14. The turbine valve control system of claim 13 wherein the position of the flow metering device comprises a position demand value for the metering valve.

15. A method for measuring gas flow rate into a gas turbine engine, comprising:
providing an adjustable position valve having a known coefficient of discharge and flow area for meeting a predetermined mass flow rate at each position of the valve;
sensing position of the valve;
sensing pressure upstream of the valve;
sensing pressure downstream of the valve;
sensing temperature upstream of the valve;
determining whether flow through the valve is subsonic or sonic;
based on whether the flow is determined to be subsonic or sonic, providing a coefficient of discharge times area for the valve that provides a desired flow rate through the valve; and
positioning the valve to a new position that achieves the calculated coefficient of discharge times area for the valve.

16. The method of claim 15 wherein the valve comprises a coaxial valve having a flow tube that is axially positioned to adjust flow rate through the valve.

17. The method of claim 16 wherein sensing position of the valve comprises providing an axial displacement sensor and sensing axial position of the flow tube relative to a flow diverter that cooperates with a downstream end of the tube to vary mass flow rate between the tube and diverter and out a flow aperture based upon axial position of the tube relative to the diverter and the flow aperture.

18. The method of claim 15 wherein determining whether flow through valve is subsonic or sonic comprises determining a ratio of upstream pressure to downstream pressure with a value that separates sonic flow conditions from subsonic flow conditions.

19. The method of claim 15 wherein, when the ratio of downstream pressure to upstream pressure is greater than or equal to the value, determining that the flow is subsonic.

20. The method of claim 15 wherein, when the ratio of downstream pressure to upstream pressure is less than the value, determining that the flow is sonic.

21. The method of claim 15 wherein providing a coefficient of discharge through the valve comprises providing a lookup table of coefficients of discharge versus valve position in memory.

22. The method of claim 15 further comprising, using a determined coefficient of discharge for realizing a desired mass flow rate, retrieving a corresponding valve position from the lookup table.

23. The method of claim 22 further comprising positioning the valve to the corresponding valve position.

24. The method of claim 15 further comprising determining a flow control set point for the valve by converting an analog demand value to a digital count set point.

25. The method of claim 24 further comprising adjusting valve position to match the count set point.

26. A turbine valve control system, comprising:
means for realizing any of a plurality of predetermined mass flow rates;
means for detecting position of the flow metering device and generating a first output signal that is a function of the positioning of the flow metering device;
means for detecting fluid pressure upstream of the flow metering device and generating a second output signal that is a function of the detected upstream fluid pressure;
means for detecting fluid pressure downstream of the flow metering device and generating a third output signal that is a function of the detected downstream fluid pressure;
means for detecting temperature upstream of the flow metering device and generating a fourth output signal that is a function of the detected temperature;
means for determining a combined coefficient of discharge times area that gives a desired flow for a given valve position, upstream pressure, downstream pressure, and temperature for subsonic flow and second calculating means for calculating a combined coefficient of discharge times area that gives a desired flow for a given valve position, upstream pressure, and temperature for sonic flow; and
means for determining whether flow is subsonic or sonic, and configured to implement a corresponding one of the first and second computer program codes to calculate a combined coefficient of discharge times area that will generate a desired mass flow rate for the flow metering device.

27. The turbine valve control system of claim 26 wherein the processing means calculates a ratio of downstream pressure to upstream pressure, and wherein the processing circuitry is configured to compare the ratio with a threshold value that separates subsonic flow from sonic flow.

28. The turbine valve control system of claim 27 wherein the ratio below the threshold value corresponds with sonic flow.

29. The turbine valve control system of claim 27 wherein the ratio above or equal to the threshold value corresponds with subsonic flow.

30. The turbine valve control system of claim 26 further comprising means for mapping a coefficient of discharge times area versus positioning of the means for realizing any of a plurality of predetermined mass flow rates.

31. The turbine valve control system of claim 26 further comprising means for converting valve position to a combined coefficient of discharge times area.

32. The turbine valve control system of claim 31 further comprising means for calculating mass flow using one of a sonic flow equation and a subsonic flow equation.

* * * * *

UNITED STATES PATENT AND TRADEMARK OFFICE
CERTIFICATE OF CORRECTION

PATENT NO. : 6,882,924 B2
DATED : April 19, 2005
INVENTOR(S) : Nathan Todd Miller It is certified that error appears in the above-identified patent and that said Letters Patent is hereby corrected as shown below:

<u>Column 4,</u>
Line 58, delete "outlet supply 18" and insert -- outlet supply pipe 18 --.

<u>Column 13,</u>
Line 2, delete "or 64 wafts", and insert -- or 64 watts --.
Line 16, delete "(714 Vdc)", and insert -- (714 VDC) --.

<u>Column 18,</u>
Line 55, delete "Pup/Pdown>2", and insert -- Pup/Pdown≥2 --.

<u>Column 19,</u>
Line 36, delete "from" after "that vary".

Signed and Sealed this

Twenty-eighth Day of June, 2005

JON W. DUDAS
*Director of the United States Patent and Trademark Office*